(12) United States Patent
Shaev et al.

(10) Patent No.: US 10,497,004 B2
(45) Date of Patent: Dec. 3, 2019

(54) AUTOMATING COMMUNICATIONS USING AN INTENT CLASSIFIER

(71) Applicant: ASAPP, INC., New York, NY (US)

(72) Inventors: Jason Shaev, New York, NY (US);
Vicky Sehrawat, New York, NY (US);
Rachel Knaster, New York, NY (US);
Shang Wei Wang, Astoria, NY (US);
Gustavo Sapoznik, Miami, FL (US)

(73) Assignee: ASAPP, INC., New York, NY (US)

( * ) Notice: Subject to any disclaimer, the term of this patent is extended or adjusted under 35 U.S.C. 154(b) by 0 days.

(21) Appl. No.: 16/189,536

(22) Filed: Nov. 13, 2018

(65) Prior Publication Data
US 2019/0180288 A1   Jun. 13, 2019

Related U.S. Application Data

(63) Continuation-in-part of application No. 15/836,110, filed on Dec. 8, 2017.

(51) Int. Cl.
*G06Q 10/10* (2012.01)
*G06Q 30/02* (2012.01)
(Continued)

(52) U.S. Cl.
CPC ....... *G06Q 30/016* (2013.01); *G06F 17/2785* (2013.01); *G06N 3/08* (2013.01);
(Continued)

(58) Field of Classification Search
CPC .............. G06Q 30/016; G06Q 30/0281; G06F 16/3329; H04L 67/148; H04L 67/12; H04M 3/5232
See application file for complete search history.

(56) References Cited

U.S. PATENT DOCUMENTS 5,195,034 A   3/1993   Garneau et al.
5,227,971 A   7/1993   Nakajima et al.
(Continued)

FOREIGN PATENT DOCUMENTS

WO   2018009231 A1   1/2018
WO   2018009432 A1   1/2018

OTHER PUBLICATIONS

Building a Node.js WebSocket Chat App with Socket.io and React Tutorial to Socket.io with JavaScript. Vincent Mühler. Feb. 22, 2018.*

(Continued)

*Primary Examiner* — Gabrielle A McCormick
(74) *Attorney, Agent, or Firm* — GTC Law Group PC & Affiliates

(57) ABSTRACT

An intent classifier may be used to increase the efficiency of a communications system. A company may provide assistance to a first user using automated processing or by a second user manually responding to the first user. To reduce costs, the company may prefer to use automated processing for assistance where it is available. While a second user is assisting a user, a message from the first user may be processed with an intent classifier to determine that automated support is available to assist the first user, and a suggestion may be presented to the second user to transfer the first user to the automated processing, such as by presenting a button to the second user to transfer the first user to the automated processing. The second user may then transfer the first user to the automated processing and assist other users.

20 Claims, 10 Drawing Sheets

(51) Int. Cl.
- *G06Q 30/00* (2012.01)
- *G06N 3/08* (2006.01)
- *G06F 17/27* (2006.01)
- *H04L 12/58* (2006.01)
- *H04L 29/08* (2006.01)
- *H04M 3/523* (2006.01)
- *G06F 16/332* (2019.01)

(52) U.S. Cl.
CPC ......... *G06Q 30/0281* (2013.01); *H04L 51/02* (2013.01); *H04L 67/148* (2013.01); *G06F 16/3329* (2019.01); *H04L 67/12* (2013.01); *H04M 3/5232* (2013.01)

(56) References Cited

U.S. PATENT DOCUMENTS

| | | |
|---|---|---|
| 5,369,575 A | 11/1994 | Lamberti et al. |
| 6,173,279 B1 | 1/2001 | Levin et al. |
| 6,177,932 B1 | 1/2001 | Galdes et al. |
| 6,327,363 B1 | 12/2001 | Henderson et al. |
| 6,381,645 B1 | 4/2002 | Sassin et al. |
| 6,453,292 B2 | 9/2002 | Ramaswamy et al. |
| 6,915,254 B1 | 7/2005 | Heinze et al. |
| 6,981,040 B1 | 12/2005 | Konig et al. |
| 7,257,564 B2 | 8/2007 | Loughmiller et al. |
| 7,603,330 B2 | 10/2009 | Gupta et al. |
| 7,644,057 B2 | 1/2010 | Nelken et al. |
| 8,024,196 B1 | 9/2011 | Wodtke et al. |
| 8,054,951 B1* | 11/2011 | Winslow ............... G06Q 30/06 379/88.01 |
| 8,156,138 B2 | 4/2012 | Kohn et al. |
| 8,271,403 B2 | 9/2012 | Rieck et al. |
| 8,494,152 B1* | 7/2013 | Roberts ............. H04M 3/42068 379/266.1 |
| 8,577,671 B1 | 11/2013 | Barve et al. |
| 8,626,509 B2 | 1/2014 | Roy et al. |
| 9,043,197 B1 | 5/2015 | Pasca et al. |
| 9,336,269 B1 | 5/2016 | Smith et al. |
| 9,591,136 B1* | 3/2017 | Garcia ................ H04M 3/5166 |
| 9,602,987 B1 | 3/2017 | Wittig |
| 9,715,496 B1* | 7/2017 | Sapoznik ............ G06F 17/2715 |
| 9,723,151 B2 | 8/2017 | McGann et al. |
| 9,727,925 B2 | 8/2017 | Subramanian et al. |
| 9,742,916 B1 | 8/2017 | Christopher |
| 9,761,222 B1 | 9/2017 | Scarasso et al. |
| 9,762,733 B1 | 9/2017 | Ramanujaiaha et al. |
| 9,805,371 B1 | 10/2017 | Sapoznik et al. |
| 9,807,037 B1 | 10/2017 | Sapoznik et al. |
| 9,875,440 B1 | 1/2018 | Commons |
| 9,892,414 B1 | 2/2018 | Henry |
| 10,049,663 B2 | 8/2018 | Orr et al. |
| 10,067,938 B2 | 9/2018 | Bellegarda |
| 10,083,451 B2 | 9/2018 | Sehrawat et al. |
| 10,083,690 B2 | 9/2018 | Giuli et al. |
| 10,089,072 B2 | 10/2018 | Piersol et al. |
| 10,109,275 B2 | 10/2018 | Henry |
| 10,127,908 B1* | 11/2018 | Deller .................... G10L 15/22 |
| 10,169,315 B1 | 1/2019 | Heckel et al. |
| 10,210,244 B1 | 2/2019 | Branavan et al. |
| 2003/0033288 A1 | 2/2003 | Shanahan et al. |
| 2003/0033347 A1 | 2/2003 | Bolle et al. |
| 2003/0103621 A1 | 6/2003 | Brown et al. |
| 2004/0003283 A1 | 1/2004 | Goodman et al. |
| 2004/0254904 A1 | 12/2004 | Nelken et al. |
| 2005/0076084 A1 | 4/2005 | Loughmiller et al. |
| 2005/0105712 A1 | 5/2005 | Williams et al. |
| 2005/0228790 A1 | 10/2005 | Ronnewinkel et al. |
| 2006/0112127 A1 | 5/2006 | Krause et al. |
| 2006/0173776 A1 | 8/2006 | Shalley et al. |
| 2007/0094217 A1 | 4/2007 | Ronnewinkel et al. |
| 2007/0100618 A1 | 5/2007 | Lee et al. |
| 2007/0121899 A1* | 5/2007 | Galvin ................... H04M 3/51 379/265.05 |
| 2007/0168448 A1 | 7/2007 | Garbow et al. |
| 2008/0091435 A1 | 4/2008 | Strope et al. |
| 2008/0112620 A1 | 5/2008 | Jiang |
| 2008/0168070 A1 | 7/2008 | Naphade et al. |
| 2008/0168135 A1 | 7/2008 | Redlich et al. |
| 2011/0066634 A1 | 3/2011 | Phillips et al. |
| 2011/0082825 A1 | 4/2011 | Sathish et al. |
| 2011/0093414 A1 | 4/2011 | Xu et al. |
| 2011/0173346 A1 | 7/2011 | Neben |
| 2011/0270771 A1 | 11/2011 | Coursimault et al. |
| 2011/0286596 A1 | 11/2011 | Gressel et al. |
| 2011/0314012 A1 | 12/2011 | Kenthapadi et al. |
| 2012/0005515 A1 | 1/2012 | Reddi et al. |
| 2012/0053945 A1 | 3/2012 | Gupta et al. |
| 2012/0102130 A1 | 4/2012 | Guyot et al. |
| 2012/0266258 A1* | 10/2012 | Tuchman ............... H04L 63/104 726/28 |
| 2013/0143587 A1 | 6/2013 | Williams et al. |
| 2013/0144605 A1 | 6/2013 | Brager et al. |
| 2013/0166485 A1 | 6/2013 | Hoffmann et al. |
| 2013/0173604 A1 | 7/2013 | Li et al. |
| 2013/0317808 A1 | 11/2013 | Kruel et al. |
| 2014/0075004 A1 | 3/2014 | Van Dusen et al. |
| 2014/0079195 A1* | 3/2014 | Srivastava ............... G06F 17/21 379/88.01 |
| 2014/0180788 A1 | 6/2014 | George et al. |
| 2014/0278379 A1 | 9/2014 | Coccaro et al. |
| 2014/0282138 A1 | 9/2014 | Hopton et al. |
| 2014/0297268 A1 | 10/2014 | Govrin et al. |
| 2014/0297281 A1 | 10/2014 | Togawa et al. |
| 2014/0317030 A1 | 10/2014 | Shen et al. |
| 2014/0330818 A1 | 11/2014 | Raina et al. |
| 2014/0365209 A1* | 12/2014 | Evermann ............ G06F 17/279 704/9 |
| 2015/0006143 A1 | 1/2015 | Skiba et al. |
| 2015/0032724 A1 | 1/2015 | Thirugnanasundaram et al. |
| 2015/0052002 A1 | 2/2015 | Welch et al. |
| 2015/0073798 A1 | 3/2015 | Karov et al. |
| 2015/0142704 A1 | 5/2015 | London |
| 2015/0149177 A1 | 5/2015 | Kalns et al. |
| 2015/0154285 A1 | 6/2015 | Saarinen et al. |
| 2015/0215624 A1 | 7/2015 | Wei |
| 2015/0220833 A1 | 8/2015 | Le |
| 2015/0220995 A1 | 8/2015 | Guyot et al. |
| 2015/0228275 A1 | 8/2015 | Watanabe et al. |
| 2015/0242385 A1 | 8/2015 | Bao et al. |
| 2015/0310377 A1 | 10/2015 | Duval et al. |
| 2015/0340032 A1 | 11/2015 | Gruenstein |
| 2015/0363393 A1 | 12/2015 | Williams et al. |
| 2015/0365387 A1 | 12/2015 | Good |
| 2016/0019816 A1 | 1/2016 | Parry et al. |
| 2016/0063067 A1 | 3/2016 | Maitra et al. |
| 2016/0078456 A1 | 3/2016 | Chakraborty et al. |
| 2016/0092688 A1 | 3/2016 | Wolrich et al. |
| 2016/0163311 A1 | 6/2016 | Crook et al. |
| 2016/0163314 A1 | 6/2016 | Fujii et al. |
| 2016/0180151 A1 | 6/2016 | Philbin et al. |
| 2016/0180838 A1 | 6/2016 | Parada San Martin et al. |
| 2016/0182672 A1 | 6/2016 | Kuperman et al. |
| 2016/0239846 A1 | 8/2016 | Arvapally et al. |
| 2016/0247068 A1 | 8/2016 | Lin |
| 2016/0323398 A1 | 11/2016 | Guo et al. |
| 2016/0328388 A1 | 11/2016 | Cao et al. |
| 2016/0364522 A1 | 12/2016 | Frey et al. |
| 2017/0011279 A1 | 1/2017 | Soldevila et al. |
| 2017/0013073 A1 | 1/2017 | Mendez et al. |
| 2017/0091320 A1 | 3/2017 | Psota et al. |
| 2017/0103324 A1 | 4/2017 | Weston et al. |
| 2017/0116982 A1 | 4/2017 | Gelfenbeyn et al. |
| 2017/0147682 A1 | 5/2017 | Alaqeeli et al. |
| 2017/0148073 A1 | 5/2017 | Nomula et al. |
| 2017/0200077 A1 | 7/2017 | Weston et al. |
| 2017/0213138 A1 | 7/2017 | Bojja et al. |
| 2017/0308523 A1 | 10/2017 | Wang et al. |
| 2017/0323016 A1 | 11/2017 | Feng et al. |
| 2018/0005112 A1 | 1/2018 | Iso-Sipila et al. |
| 2018/0012231 A1 | 1/2018 | Sapoznik et al. |
| 2018/0012232 A1 | 1/2018 | Sehrawat et al. |
| 2018/0013699 A1 | 1/2018 | Sapoznik et al. |
| 2018/0018562 A1 | 1/2018 | Jung |

(56) References Cited

U.S. PATENT DOCUMENTS

| | | | |
|---|---|---|---|
| 2018/0032755 A1* | 2/2018 | Odinak | G06F 21/313 |
| 2018/0052664 A1 | 2/2018 | Zhang et al. | |
| 2018/0068233 A1 | 3/2018 | Miranda et al. | |
| 2018/0121738 A1 | 5/2018 | Womack et al. | |
| 2018/0131645 A1 | 5/2018 | Magliozzi et al. | |
| 2018/0143965 A1 | 5/2018 | Willson et al. | |
| 2018/0174037 A1 | 6/2018 | Henry | |
| 2018/0174579 A1 | 6/2018 | Henry | |
| 2018/0181807 A1 | 6/2018 | Yankov | |
| 2018/0203848 A1 | 7/2018 | Perez et al. | |
| 2018/0232434 A1 | 8/2018 | Geyik et al. | |
| 2018/0239830 A1 | 8/2018 | Dialani et al. | |
| 2018/0329886 A1 | 11/2018 | Li et al. | |
| 2018/0365702 A1 | 12/2018 | Sehrawat et al. | |
| 2018/0376002 A1* | 12/2018 | Abraham | H04M 3/5183 |
| 2019/0019503 A1 | 1/2019 | Henry | |

OTHER PUBLICATIONS

"Scikit-learn: Machine Learning in Python", scikit-learn 0.17.1 documentation, http://scikit-learn.org/stable/ (accessed on Sep. 20, 2016), 3 pages.

"Using algorithms for advanced customer care", Nokia Strategic white paper, https://resources.ext.nokia.com/asset/200614 (accessed Jul. 26, 2017), 2017, 11 pages.

Al-Rfou, Rami et al., "Conversational Contextual Cues: The Case of Personalization and History for Response Ranking", CoRR abs/1606.00372, http://arxiv.org/abs/1606.00372, 2016, 10 pages.

Bahdanau, Dzmitry et al., "Neural Machine Translation by Jointly Learning to Align and Translate", CoRR abs/1409.0473, http://arxiv.org/abs/1409.0473, May 19, 2016, 15 pages.

Bengio, Yoshua et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.

Berger, Mark J., "Large Scale Multi-label Text Classification with Semantic Word Vectors", published 2015 (Year: 2015), Department of Computer Science, Stanford University, Stanford, CA 94305, mjberger@stanford.edu, 2015, pp. 1-8.

Black, William J. et al., "Facile: Description of the NE System Used for MUC-7", Proceedings of the 7th Message Understanding Conference, https://www-nlpir.nist.gov/related_projects/muc/proceedings/muc_7_proceedings/facile_muc7.pdf, 1998, 10 pages.

Blei, David M. et al., "Latent Dirichlet Allocation", Journal of Machine Learning Research, vol. 3, 2003, pp. 993-1022.

Brown, Peter F. et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).

Carrier, Pierre L. et al., "LSTM Networks for Sentiment Analysis", http://deeplearning.net/tutorial/lstm.html, accessed on Sep. 20, 2016, 5 pages.

Chandar, Sarath et al., "Correlational Neural Networks", CoRR abs/1504.07225, http://arxiv.org/abs/1504.07225, Oct. 12, 2015, 27 pages.

Chen, Wenlin et al., "Compressing Neural Networks with the Hashing Trick", arXiv:1504.04788v1, https://arxiv.org/pdf/1504.04788.pdf (accessed on Nov. 26, 2018), Apr. 19, 2015, 10 pages.

Chen, Yun-Nung et al., "An empirical investigation of sparse log-linear models for improved dialogue act classification", 2013 IEEE International Conference on Acoustics. Speech and Signal Processing. IEEE., 2013, 6 pages.

Chen, Yun-Nung, "An empirical investigation of sparse log-linear models for improved dialogue act classification.", 2013 IEEE International Conference on Acoustics, Speech and Signal Processing. IEEE, 2013, pp. 1-6.

Cheng, Yong et al., "Semi-Supervised Learning for Neural Machine Translation", CoRR abs/1606.04596, http://arxiv.org/abs/1606.04596, Dec. 10, 2016, 10 pages.

Collados, Jose C., "On the contribution of neural networks and word embeddings in Natural Language Processing", published at Medium.com, Jan. 2018. (Year: 2018), http://www.josecamachocollados.com, Jan. 2018, pp. 1-7.

Courbariaux, Matthieu et al., "BinaryConnect: Training Deep Neural Networks with binary weights during propagations", CoRR, accessed at https://arxiv.org/pdf/1511.00363v3.pdf, 2015 (Jan. 3, 2017), 9 pages.

De La Briandais, Rene, "File Searching Using Variable Length Keys", Proceedings of the 1959 Western Joint Computer Conference, https://pdfs.semanticscholar.org/3ce3/f4cc1c91d03850ed84ef96a08498e018d18f.pdf, 1959, pp. 295-298.

Deerwester, Scott et al., "Improving Information Retrieval with Latent Semantic Indexing", Proceedings of the 51st ASIS Annual Meeting (ASIS '88), vol. 25, Oct. 1988, pp. 36-40.

Deerwester, Scott et al., "Indexing by Latent Semantic Analysis", Journal of the Association for Information Science and Technology, vol. 41, iss. 6, Sep. 1990, pp. 391-407.

Frome, Andrea et al., "Large-scale Privacy Protection in Google Street View", 2009 IEEE 12th International Conference on Computer Vision https://pdfs.semanticscholar.org/e645/6ac0e57396f222689dc71a310c2779a31488.pdf, Sep. 29-Oct. 2, 2009, 8 pages.

Gong, Yunchao et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 817-824.

Goodfellow, Ian J. et al., "Generative Adversarial Nets", Advances in Neural Information Processing Systems 27 (NIPS 2014), https://papers.nips.cc/paper/5423-generative-adversarial-nets.pdf, 2014, pp. 2672-2680.

Gray, R., "Vector quantization", IEEE ASSP Magazine, vol. 1, iss. 2 https://ieeexplore.ieee.org/document/1162229/ (abstract only), Apr. 1984, pp. 4-29.

Henderson, Matthew et al., "Efficient Natural Language Response Suggestion for Smart Reply", arXiv:1705.00652v1, https://arxiv.org/pdf/1705.00652.pdf, May 1, 2017, 15 pages.

Hochreiter, Sepp et al., "Long Short-Term Memory", Neural Computation, vol. 9, iss. 8, 1997, pp. 1735-1780.

Hochreitner, Sepp et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.

Huang, Zhiheng et al., "Bidirectional LSTM-CRF Models for Sequence Tagging", arXiv:1508.01991v1, https://arxiv.org/pdf/1508.01991.pdf, Aug. 9, 2015, 10 pages.

Iyyer, Mohit et al., "Deep Unordered Composition Rivals Syntactic Methods for Text Classification", Association for Computational Linguistics (ACL), http://cs.umd.edu/~miyyer/pubs/2015_acl_dan.pdf, 2015, 11 pages.

Ji, Zongcheng et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.

Karpathy, Andrej, "The Unreasonable Effectiveness of Recurrent Neural Networks", http://karpathy.github.io/2015/05/21/rnn-effectiveness/, (accessed on Sep. 20, 2016), May 21, 2015, 42 pages.

Kim, Yoon et al., "Character-Aware Neural Language Models", CoRR abs/1508.06615, http://arxiv.org/abs/1508.06615, 2015, 9 pages.

Kim, Yoon, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.

Kiros, Ryan et al., "Skip-Thought Vectors", Proceedings of the 28th International Conference on Neural Information Processing Systems, vol. 2., 2015, pp. 3294-3302.

Lafferty, John et al., "Conditional Random Fields: Probabilistic Models for Segmenting and Labeling Sequence Data", https://repository.upenn.edu/cgi/viewcontent.cgi?article=1162&context=cis_papers, The definitive version was published in Proceedings of the 18th International Conference on Machine Learning 2001 (ICML 2001), pp. 282-289, Jun. 2001, 10 pages.

(56) References Cited

OTHER PUBLICATIONS

Lai, Hanjiang et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Learning_2015_CVPR_paper.pdf, 2015 (accessed Jan. 3, 2017), pp. 3270-3278.

Lai, Siwei et al., "Recurrent Convolutional Neural Networks for Text Classification", AAAI'15 Proceedings of the Twenty-Ninth AAAI Conference on Artificial Intelligence, 2015, pp. 2267-2273.

Lample, Guillaume et al., "Unsupervised Machine Translation Using Monolingual Corpora Only", CoRR abs/1711.00043, http://arxiv.org/abs/1711.00043, Oct. 31, 2017, 12 pages.

Larochelle, Hugo et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.

Le, Quoc et al., "Distributed Representations of Sentences and Documents", Proceedings of the 31st International Conference on Machine Learning, W&CP vol. 32, Beijing, China, 2014, 9 pages.

Lee, Cheongjae et al., "Robust Dialog Management with N-best Hypotheses Using Dialog Examples and Agenda", Proceedings of ACL-08: HLT, Columbus, Ohio, Jun. 2008, pp. 630-637.

Levy, Omer et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.

Li, Jiwei et al., "A Hierarchical Neural Autoencoder for Paragraphs and Documents", Proceedings of the 53rd Annual Meeting of the Association for Computational Linguistics and the 7th International Joint Conference on Natural Language Processing,Beijing, China, http://web.stanford.edu/~jurafsky/pubs/P15-1107.pdf, Jul. 26-31, 2015 (accessed on Jan. 3, 2017), pp. 1106-1115.

Lin, Hui et al., "Multi-document Summarization via Budgeted Maximization of Submodular Functions", In Proceed. of Human Language Technologies: The Conf. of the North American Chapter of the Association for Computational Linguistics (NAACL-HLT), (accessed Nov. 26, 2018 at https://pdfs.semanticscholar.org/6286/a97ae2d9cff9b69f14d6cee3c611a1a63379.pdf), 2010, pp. 912-920.

Lin, Zhouhan et al., "A Structured Self-Attentive Sentence Embedding", arXiv:1703.03130v1, https://arxiv.org/pdf/1703.03130.pdf (accessed Jul. 13, 2017), Mar. 9, 2017, 15 pages.

Logeswaran, Lajanugen et al., "An Efficient Framework for Learning Sentence Representations", International Conference on Learning Representations, https://openreview.net/pdf?id=rJvJXZb0W, 2018, 16 pages.

Logeswaran, Lajanugen et al., "An efficient framework for learning sentence representations", ICLR 2018 Conference Blind Submission, https://openreview.net/pdf?id=rJvJXZb0W (accessed Nov. 26, 2018), Feb. 15, 2018, 16 pages.

Miao, Yishu et al., "Neural Variational Inference for Text Processing", CoRR abs/1511.06038, http://arxiv.org/abs/1511.06038, 2015, 15 pages.

Mikolov, Tomas et al., "Distributed Representations of Words and Phrases and their Compositionality", CoRR abs/1310.4546, http://arxiv.org/abs/1310.4546, 2013, 9 pages.

Mikolov, Tomas et al., "Distributed Representations of Words and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.

Mikolov, Tomas et al., "Recurrent neural network based language model", Interspeech 2010, Sep. 26-30, 2010, Makuhari, Chiba, Japan, 2010, pp. 1045-1048.

Mikolov, Tomas et al., "Recurrent neural network based language model", Interspeech 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan 3, 2017), pp. 1045-1048.

Pagliardini, Matteo et al., "Unsupervised Learning of Sentence Embeddings using Compositional n-Gram Features", CoRR abs/1703.02507, http://arxiv.org/abs/1703.02507, Jul. 10, 2017, 11 pages.

PCT/US18/19731, "International Application Serial No. PCT/US18/19731, filed Feb. 26, 2018", 38 pages.

PCT/US2016/049896, "Application Serial No. PCT/US2016/049896, International Search Report and the Written Opinion dated May 19, 2017", 14 pages.

PCT/US2016/049896, "International Application Serial No. PCT/US2016/049896, International Preliminary Report on Patentability dated Jan. 17, 2019", Asapp, Inc., 9 pages.

PCT/US2017/040205, "Application Serial No. PCT/US2017/040205, International Search Report and the Written Opinion dated Sep. 15, 2017", 11 pages.

PCT/US2017/040205, "International Application Serial No. PCT/US2017/040205, International Preliminary Report on Patentability dated Jan. 17, 2019", Asapp, Inc., 9 pages.

PCT/US2019/014569, "International Application Serial No. PCT/US2019/014569, International Search Report and Written Opinion dated Mar. 4, 2019", Asapp, Inc., 13 pages.

Pennington, Jeffrey et al., "GloVe: Global Vectors forWord Representation", Empirical Methods in Natural Language Processing (EMNLP), http://www.aclweb.org/anthology/D14-1162, (accessed on Nov. 26, 2018 from https://nlp.stanford.edu/pubs/glove.pdf), 2014, pp. 1532-1543.

Rush, Alexander M. et al., "Optimal Beam Search for Machine Translation", Proceedings of EMNLP 2013, Oct. 18-21, 2013, Seattle, Washington, USA, 2013, 12 pages.

See, Abigail et al., "Get to the Point: Summarization with Pointer-Generator Networks", CoRR abs/1704.04368, http://arxiv.org/abs/1704.04368, Apr. 25, 2017, 20 pages.

Shen, Tianxiao et al., "Style Transfer from Non-Parallel Text by Cross-Alignment", CoRR abs/1705.09655, http://arxiv.org/abs/1705.09655, Nov. 6, 2017, 12 pages.

Shi, Yangyang et al., "Contextual spoken language understanding using recurrent neural networks.", 2015 IEEE International Conference on Acoustics, Speech and Signal Processing (ICASSP). IEEE, 2015, pp. 5271-5275.

Sutskever, Ilya et al., "Sequence to Sequence Learning with Neural Networks", CoRR abs/1409.3215, http://arxiv.org/abs/1409.3215, 2014, 9 pages.

Tai, Kai S. et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.

Vincent, Pascal et al., "Extracting and Composing Robust Features with Denoising Autoencoders", Proceedings of the 25th International Conference on Machine Learning, Helsinki, Finland, http://www.cs.toronto.edu/~larocheh/publications/icml-2008-denoising-autoencoders.pdf (accessed on Nov. 26, 2018), 2008, 8 pages.

Vincent, Pascal et al., "Stacked Denoising Autoencoders: Learning Useful Representations in a Deep Network with a Local Denoising Criterion", Journal of Machine Learning Research 11, http://www.jmlr.org/papers/volume11/vincent10a/vincent10a.pdf, published Dec. 2010, pp. 3371-3408.

Vinyals, Oriol et al., "A Neural Conversational Model", CoRR abs/1506.05869, http://arxiv.org/abs/1506.05869, 2015, 8 pages.

Wang, Sida et al., "Baselines and Bigrams: Simple, Good Sentiment and Topic Classification", Proceedings of the 50th Annual Meeting of the Association for Computational Linguistics, Jeju, Republic of Korea, https://www.aclweb.org/anthology/P12-2018, Jul. 8-14, 2012, pp. 90-94.

Xiao, Yijun et al., "Efficient Character-level Document Classification by Combining Convolution and Recurrent Layers", CoRR abs/1602.00367, https://arxiv.org/pdf/1602.00367.pdf, Feb. 1, 2016, 10 pages.

Zhang, Xiang et al., "Character-level Convolutional Networks for Text Classification", CoRR abs/1509.01626, http://arxiv.org/abs/1509.01626, 2015, 9 pages.

Zhao, Han et al., "Self-Adaptive Hierarchical Sentence Model", CoRR abs/1504.05070, http://arxiv.org/abs/1504.05070, Apr. 27, 2015, 8 pages.

(56) References Cited

OTHER PUBLICATIONS

U.S. Appl. No. 15/836,110, filed Dec. 8, 2017, Pending, Jason Shaev.
PCT/US2018/064404, filed Dec. 7, 2018, Pending, Jason Shaev.
PCT/US2018/064404, "International Application Serial No. PCT/US2018/064404, International Search Report and Written Opinion dated Feb. 25, 2019", Asapp, Inc., 9 pages.

* cited by examiner

| | |
|---|---|
| Don Miller | 05:03 |
| GENERAL BILLING ISSUE | |
| Waiting for reply... | |
| Ray Jackson | 00:07 |
| PAYMENT | |
| The strange charge on my account is still there. I tried to fix it myself... | |
| Cathy Washington | 01:25 |
| GENERAL BILLING ISSUE | |
| I need to pay the bill to my account and... | |
| Julie Cooper ⊘ | 00:13 |
| INVALID PURCHASE | |
| Waiting for reply... | |
| John Allen ⊘ | 00:13 |
| GENERAL BILLING ISSUE | |
| GREAT! Thanks so much for helping me. | |
| EMPTY SLOT | |
| EMPTY SLOT | |

320

TIME OUT | TRANSFER | END

BEFORE A REPRESENTATIVE JOINS THE CHAT, PLEASE PROVIDE YOUR PIN AND ACCOUNT NUMBER SO WE CAN VIEW YOUR ACCOUNT.

✉ ✓and 112354350 ✓

——— 10:10AM ———

You are now connected with Cathy

Hello there Cathy! I'll be more than happy to assist you today. I would love to check on that. Please give me a moment will I look through your account.

Movie 2 was purchased on 10/02 at 11:21 am for $5.99. It will be refunded for the full purchasing price.

There is currently no pin setup for you account, which is why you have unwanted purchases. Would you like me to provide you the steps on how to set it up to your email on file: cathyw@aol.com?

Yes please.

Great! I have successfully sent the email on how to set it up. Also, the refund on Movie 2 has been processed. Your new balance is $120.23.

type here

330

🔍 search...

We have the following automated processing that may be able to assist the customer's current issue:

(1) Make payment: [ Transfer Customer ]

(2) Request copy of bill: [ Transfer Customer ]

Knowledge Base | Customer History | ● Customer Profile

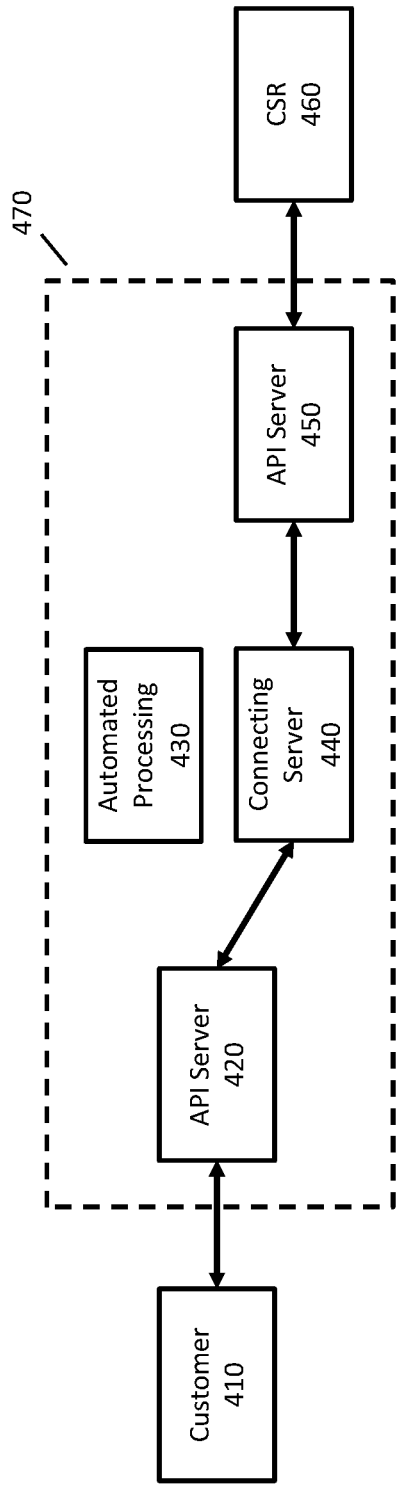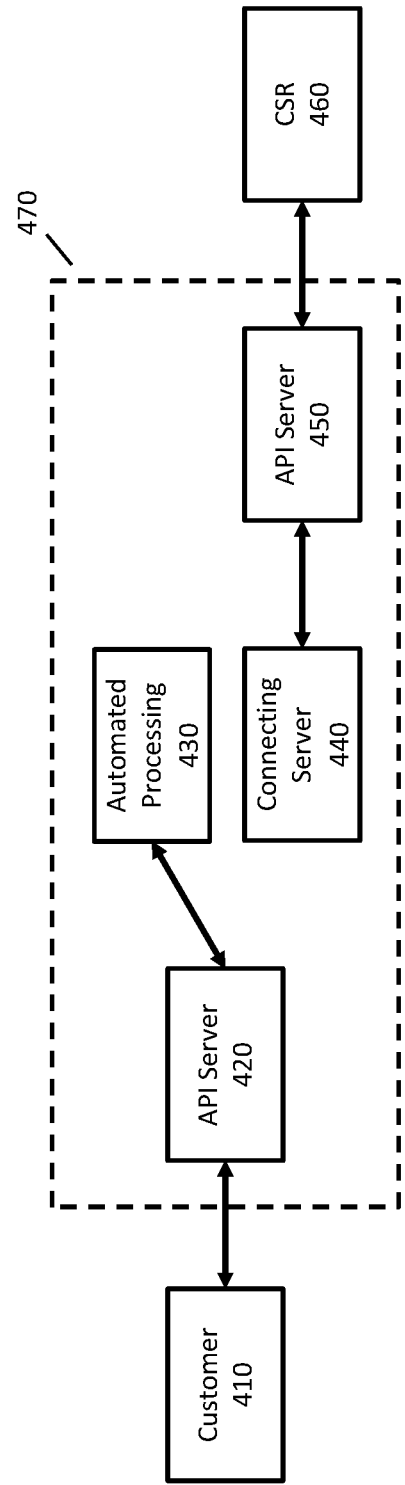

AUTOMATING COMMUNICATIONS USING AN INTENT CLASSIFIER

CLAIM OF PRIORITY

The present application is a continuation-in-part of U.S. patent application Ser. No. 15/836,110, filed on 8 Dec. 2017, and entitled "TRANSFER OF CUSTOMER SUPPORT TO AUTOMATED PROCESSING". The Ser. No. 15/836,110 application is incorporated herein by reference in its entirety for all purposes.

FIELD OF THE INVENTION

The present invention relates to improving the efficiency of communications by using an intent classifier to determine when automated processing is available.

BACKGROUND

Companies need to efficiently interact with users to provide services to their users. For example, users may need to obtain information about services of the company, may have a question about billing, or may need technical support from the company. Companies interact with users in a variety of different ways. Companies may have a website and the users may navigate the website to perform various actions. Companies may have an application ("app") that runs on a user device, such as a smart phone or a tablet, that provides similar services as a website. Companies may have a phone number that users can call to obtain information via interactive voice response or to speak with a customer service representative. Companies may also respond to users using various social media services, such as Facebook or Twitter.

Some existing techniques for allowing users to interact with companies may be a nuisance to the users. Navigating to the right page on a website or an app or navigating a voice menu on a phone call may be time consuming. Some existing techniques for allowing users to interact with companies may be expensive for a company to implement. Hiring customer service representatives to manually respond to requests and answer phone calls may be a significant expense.

BRIEF DESCRIPTION OF THE FIGURES

The invention and the following detailed description of certain embodiments thereof may be understood by reference to the following figures:

FIG. 3 is an example user interface for a customer service representative to provide support to a customer.

FIGS. 4A and 4B illustrate transitioning a customer between support provided by a customer service representative and automated processing.

DETAILED DESCRIPTION

Figure 1A:
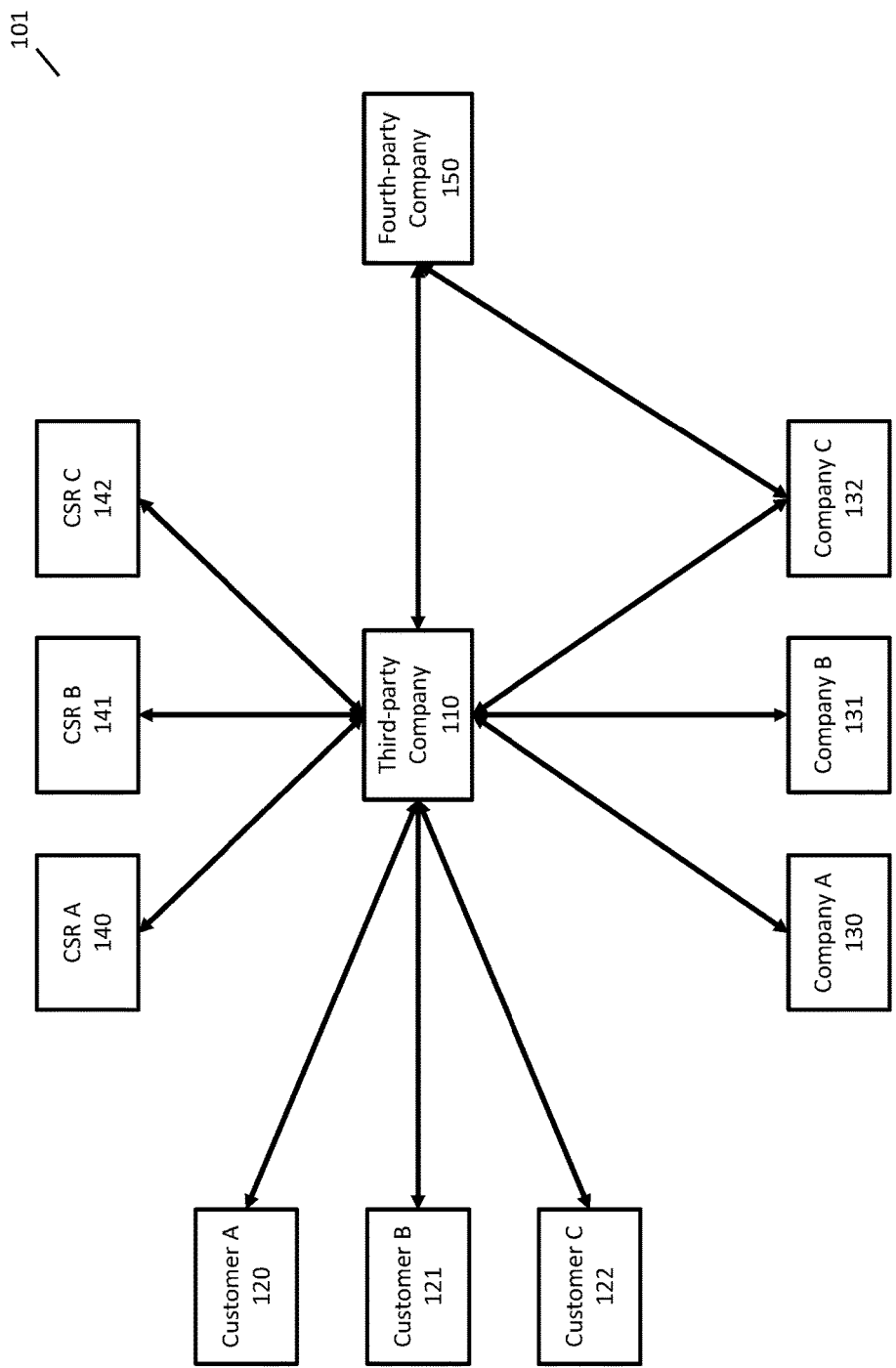
FIGS. 1A-1C are example systems by which a third-party company may provide customer support services to companies.

Described herein are techniques for improving the efficiency of the customer support process by transferring a customer from receiving support from a human customer service representative (CSR) to automated processing where automated processing techniques are available to resolve the customer's customer support issue. A company may have implemented automated processing for some support issues but not for other support issues. For example, for more common and/or simpler support needs such as updating an address or making a payment with a credit card, a company may have implemented automated processing techniques to perform these tasks so a CSR is not needed to perform the task. For other less common and/or more complicated support needs such as changing the services provided to the customer or upgrading equipment, a company may not have automated processing to perform these tasks, and the customer may need to interact with a CSR to accomplish the tasks. As used herein, a CSR will indicate a person providing support to a customer, such as via messaging or a phone call.

A customer may seek support from a company using a variety of communication techniques, and the techniques described herein are not limited to any particular communication techniques. For example, a customer may communicate by entering text messages or speaking, and the customer may send the communication using any appropriate device, such as a computer, smart phone, tablet, wearable device, or Internet of things device. The customer may transmit a communication using any appropriate techniques, such as using an app running on customer device (e.g., an app of the company or a third-party app created for processing customer requests), a web page, a text messaging client, or sending an email. As used herein, a text message includes any message sent as text including but not limited to a message sent using SMS (short message service) or a special-purpose application (e.g., Facebook messenger, Apple iMessage, Google Hangouts, or WhatsApp).

Customer communications include any interactions between a customer and a system to provide assistance to the customer. A customer communication includes, for example: a text message, speech, an input to field data (e.g., a web-based form field), or selection of a user interface element. Customer communications may be numbered herein for clarity of description (e.g., a first customer communication) but may not be provided by the customer in the order described or considered by the customer support system. When a customer communication is transmitted from one device in a system to another device in a system, the customer communication may be processed before or after being transmitted (e.g., speech to text conversion). The transmitted or processed customer communication may be considered the same communication or another communication.

A customer seeking customer support may have multiple support issues in a single customer support session. For example, a customer may first want to change services received by the customer (e.g., adding a paid cable channel) and then want to update his address. For each issue of the customer, it may be determined whether that issue may be handled by automated processing or needs to be handled by a CSR, and the customer may be connected with automated processing or a CSR as needed.

The determination of whether a customer's issue may be handled by automated processing or needs to be handled by a CSR may be performed by automated processing or a CSR. For example, for a first message received from a customer, the message may be processed by automated processing to determine whether the issue should be handled by automated processing or a CSR. Alternatively, the first message may be transmitted to a CSR who determines whether the issue should be handled by automated processing or a CSR.

When the customer's first issue has been resolved (whether by automated processing or a CSR), and the customer presents a second issue, then it needs to be determined whether that second issue should be handled by automated processing or by a CSR. Where automatic processing resolved the first issue, then additional automated processing may be performed to determine whether the second issue should be handled by automatic processing or by a CSR.

Where the first issue was resolved by a CSR, then a CSR may receive information about the second issue of the customer and determine whether the CSR should resolve the issue himself or transfer the customer to automated processing. In some implementations, where a CSR decides to transfer the customer to automated processing, the CSR may navigate a list or menu of available automated processing tasks. Where the number of automated processing tasks is large, however, it may be time consuming for the CSR to find the right automated processing task to resolve the customer's second issue.

In some implementations, automated processing may be used to assist the CSR in transferring the customer to an automated processing task. For example, a message from the customer relating to the second task may be automatically processed to understand the customer's issue, and the automated processing may then present one or more suggestions to the CSR regarding available automated processing tasks that may be used to resolve the second issue. For example, a button may be presented to the CSR to transfer the customer to automated processing for updating an address. The CSR may then conclude the first issue (e.g., say "thank you"), inform the customer that automated processing will be used for the second issue, and select the button to transfer the customer to automated processing for the second issue. In some implementations, multiple buttons may be presented to the CSR, and the CSR may select a most relevant automated processing task to resolve the customer's second issue. Alternatively, the CSR may decide not to use the suggestion and instead resolve the second issue himself (e.g., if none of the suggestions are appropriate or it would be a better experience for the customer for the CSR to resolve the second issue).

In automating communications with a customer, it may be desired to determine an intent of a message received from the customer. A company implementing an automated communications system may categorize the messages it expects to receive from customers into a fixed number of defined intents. By categorizing messages into intents, it may be easier for the company to provide an automated response. For example, a YES intent may include a variety of ways of communicating agreement (e.g., "yes", "ok", "that's good", etc.). To provide a response, it may be sufficient to know the intent of the message, and the specific manner in which the intent was expressed may not be important.

To determine an intent of a message, a company process a received message with a mathematical model, such as an intent classifier. The mathematical model may provide an output that indicates the intent of the message from a list of possible intents or that indicates that the message does not match any intent of the list of intents.

As used herein, an intent is a set of messages that have similar meaning. A company may define a set of intents (such as hundreds, thousands, or more intents), and the intents may be defined using any appropriate techniques. For example, an intent may be defined by a mathematical model that processes messages to determine intents of the messages or by a corpus of training data that was used to create the mathematical model. Because a concept may be expressed using a wide variety of language, an intent may correspond to large number of messages.

An intent may be assigned a label to make it easier for humans to understand the types of messages corresponding to the intent. For example, a YES intent may include messages that express agreement, a NO intent may include messages that express disagreement, and a PAY_BILL intent may include messages that express a desire to pay a bill.

In some implementations, an intent may have slots to allow greater flexibility. For example, where a company sells a large number of products, it may not be feasible to have an intent relating to the purchase of each of the products. Instead, an intent may have a slot (e.g., a parameter or a variable) to allow a single PURCHASE intent to cover the purchase of any product. For example, a PURCHASE intent may have a slot for a product, and when it is determined that a message corresponds to the PURCHASE intent, the message may also be processed to determine the value of the slot (e.g., the customer would like to purchase a stapler).

The techniques described herein for providing customer support to a customer and determining an intent of a message received form a customer may use any of the techniques described in U.S. Pat. No. 9,715,496 or U.S. Pat. No. 10,083,451, each of which is hereby incorporated by reference in its entirety for all purposes.

Figure 1B:
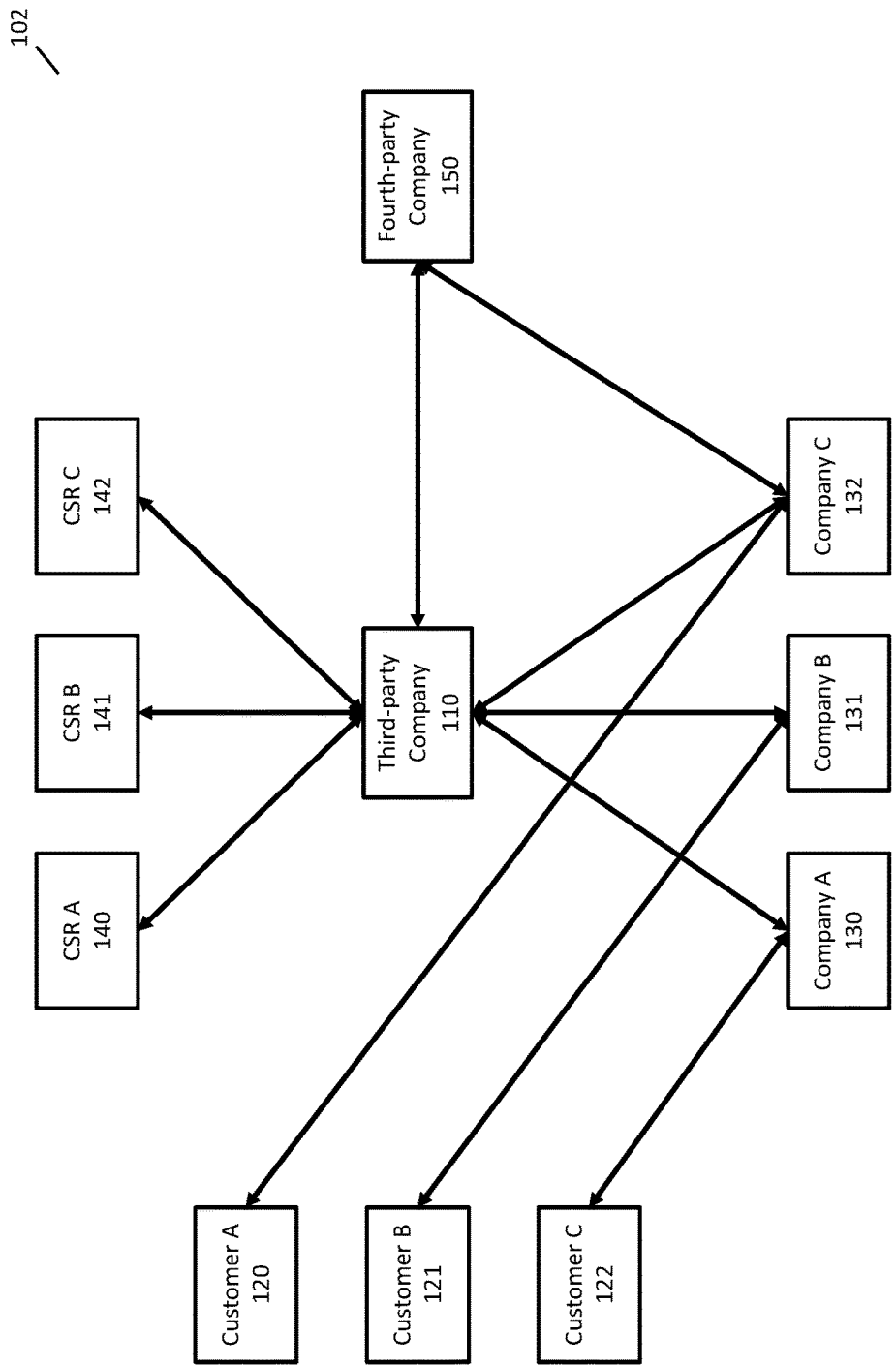
Figure 1C:
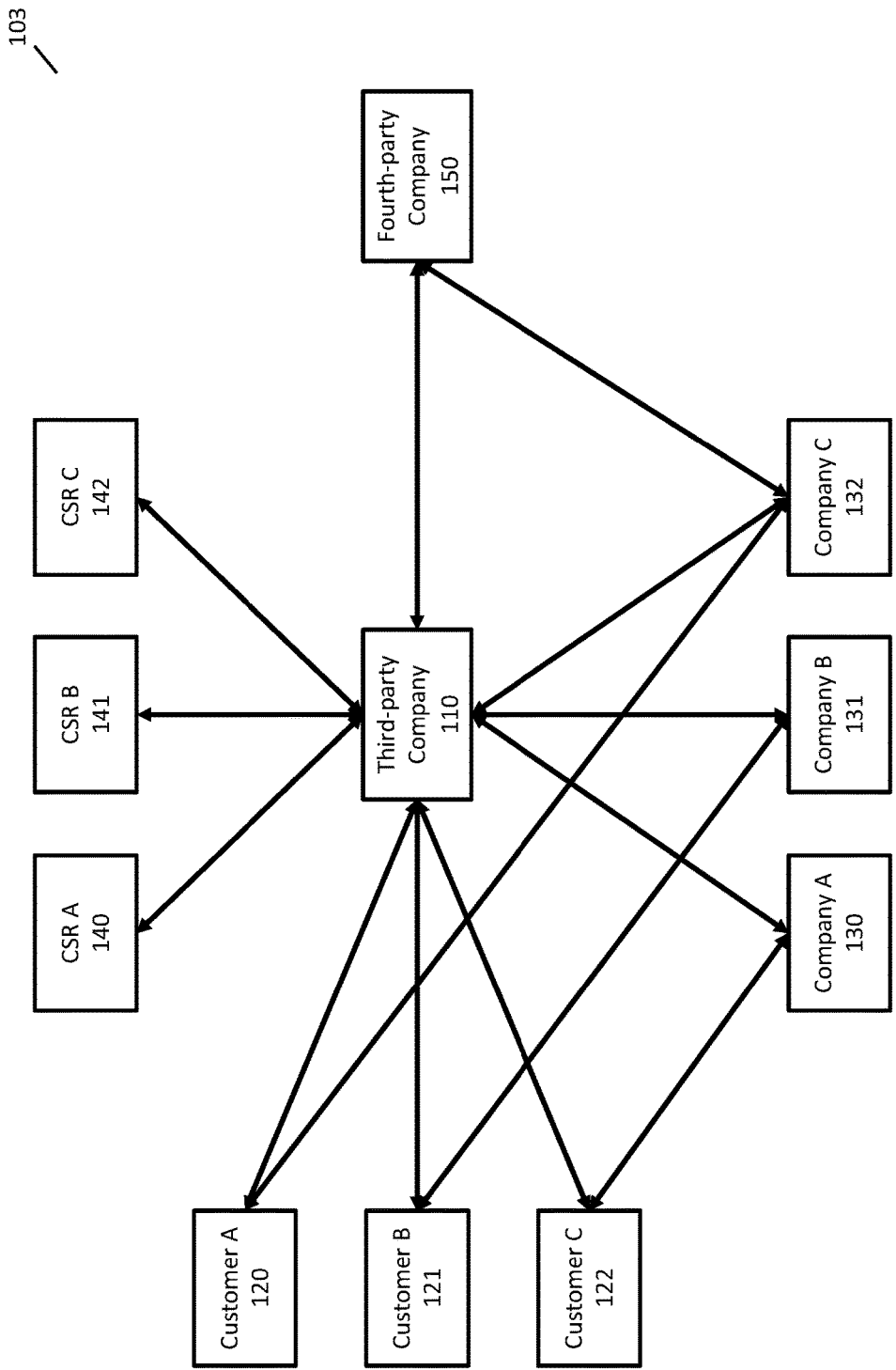

A company providing customer support to its customers may desire to use the services of a third-party company to improve the customer support experience and to reduce overall customer support costs. For example, a company may find it more cost effective to use customer support services of a third-party company than to implement its own customer support services. For example, a third-party company may provide services relating to determining whether customer support issues should be handled automatically or by a CSR and then connect the customer to automated processing or a CSR as needed. FIGS. 1A-C illustrate three different architectures that may be used by a company to obtain assistance from a third-party company in providing customer support to its customers.

FIG. 1A illustrates a system 101 that allows a third-party company 110 to provide customer support services to multiple companies where the third-party company 110 is an intermediary between the customer and the company for all communications between the customer and the company. In FIG. 1A, third-party company 110 is providing customer support services to company A 130, company B 131, and company C 132. Third-party company 110 may provide customer support services to any number of companies.

Customers of each company may seek customer support from a company via third-party company 110, and it may or may not be apparent to the customers whether they are seeking customer support directly from the company or via third-party company 110. For example, customer A 120 may be seeking support from company A 130, customer B 121 may be seeking support from company B 131, and customer C 122 may be seeking support from company C 132.

Third-party company 110 may assist a company in providing customer support in a variety of ways. In some implementations, third-party company 110 may automatically respond to a request of a customer by using semantic processing of text of a customer request. In some implementations, third-party company 110 may assist in connecting a customer with a customer service representative (CSR) working on behalf of the company. For example, third-party company 110 may select a CSR, may provide a user interface to a customer to make it easier for a customer to request support, and may provide a user interface to a CSR to assist the CSR in responding to a request of a customer.

In FIG. 1A, third-party company 110 has connected customer A 120 with CSR A 140, has connected customer B 121 with CSR B 141, and has connected customer C 122 with CSR C 142. Each CSR may have any appropriate relationship with the company on behalf of which it is providing customer support. For example, a CSR may be an employee or contractor of a company and providing customer support to only customers of that company, or a CSR may be providing services to multiple companies and providing support to customers of the multiple companies at the same time.

In some implementations, third-party company 110 may also use services of a fourth-party company 150 in providing support services to companies. For example, third-party company 110 may use fourth-party company 150 in providing support services to company C 132. Fourth-party company 150 may provide any services relevant to providing customer support to a customer. For example, fourth-party company 150 may provide payment services or provide information to be provided to the customer or CSR, such as information associated with the weather or stock prices.

FIG. 1B illustrates a system 102 that allows third-party company 110 to provide customer support services to multiple companies where third-party company 110 communicates with the companies but does not communicate directly with customers. In FIG. 1B, the customers have network connections with the corresponding companies but not directly with third-party company 110.

To use the customer support services of third-party company 110, a company may issue requests to servers of third-party company 110. In some implementations, third-party company 110 may provide an API (e.g., a REST API) via its servers to allow the company to use the customer support services. For example, company A 130 may receive a request from customer A 120 and desire to use the services of third-party company 110. Company A 130 may have its servers issue a request to servers of third-party company 110 to determine an automatic response, to connect customer A 120 with CSR A 140, or to provide user interfaces to Customer A 120 or CSR A 140. In some implementations, the request from company A 130 to third-party company 110 may include all information needed for third-party company 110 to provide its services, such as the text of the request, previous messages between customer A 120 and company A 130, or information from a customer profile of customer A 120. In some implementations, the servers of third-party company 110 may request information from servers of company A 130 in providing customer support services.

FIG. 1C illustrates a system 103 that allows third-party company 110 to provide customer support services to multiple companies where customers may communicate directly with the corresponding company and/or third-party company 110. In FIG. 1C, third-party company 110 may provide customer support services to companies using any combination of the techniques described above. In FIG. 1C, the customers have network connections with both the corresponding companies and third-party company 110.

Where customers are connected to both a company and third-party company 110, each of the two connections may be used for different kinds of requests. For example, where the customer is interacting with the company in a way that does not require the services of third-party company 110 (e.g., navigating a web site of the company), the customer may use the network connection with the company. Where the customer is interacting with the company in a way that uses the services of third-party company 110, the connection with the third party may be used. It may not be apparent to the customer whether the customer is using a network connection with the company or with third-party company 110.

Figure 2:
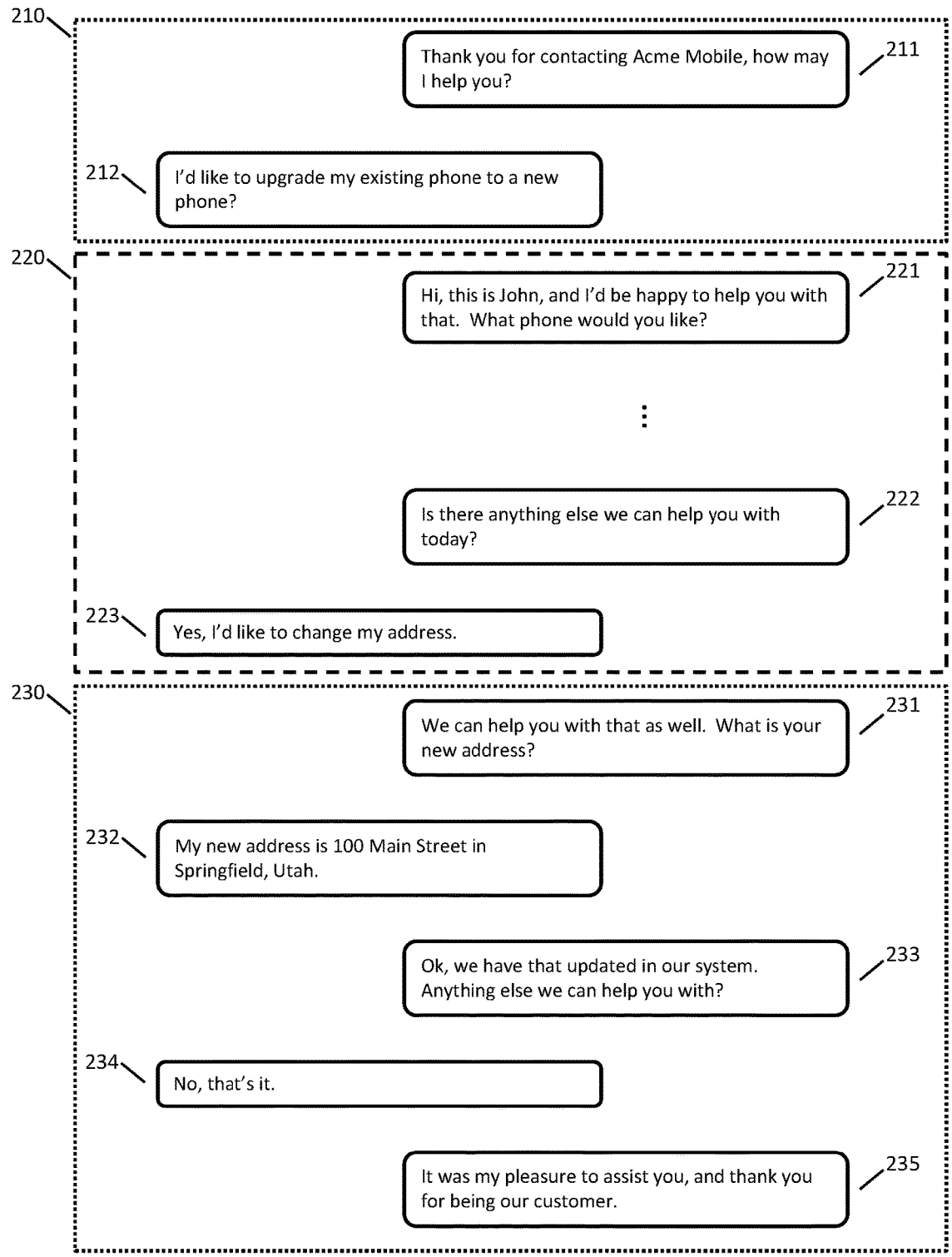
FIG. 2 is an example customer support session with support provided by a customer service representative and automated processing.

FIG. 2 is an example of a customer support session with a customer where part of the session is handled by automated processing and part of the session is handled by a CSR. The messages of FIG. 2 may be presented on a display of a customer device, and some or all of the messages may also be displayed on a display of a CSR device.

A first portion 210 of the session is handled by automated processing. To start the session, the customer may take any appropriate action, such as opening a chat window. A first message 211 is presented to the customer and the first message may be automatically generated. For example, the first message may be the same for all customers or automatically generated for the customer based on information about the customer. In response, the customer sends message 212 asking for help with upgrading his phone. This message is automatically processed to determine a meaning or intent of the message as described in greater detail below. A result of the automated processing is to connect the customer with a CSR to resolve the issue. For example, no automated processing may exist for helping a customer upgrade a phone. The customer is then connected with a CSR.

A second portion 220 of the session is handled by the CSR. Message 212 may be presented to the CSR, and the CSR may respond with message 221. The customer and CSR may then send additional messages (not shown) to each other to ultimately resolve the customer's issue. After resolving the issue, CSR may send message 222 to see if the customer needs any additional assistance, and the customer responds with message 223 indicating that he would like to change his address. Because automated processing is available to assist the customer with an address change, the CSR transfers the customer back to automated processing to change the customer's address. For example, a CSR user interface may present one or more buttons to transfer the customer to different automated processing tasks, and the CSR may select a button to transfer the customer to an automated processing task for updating an address.

A third portion 230 of the session is handled by automated processing. The automated processing may send message 231 to start the address change and the customer may respond with message 232 to provide the new address. The automated processing may then ask the customer if he needs any further assistance with message 233. The customer responds with message 234 that no further assistance is needed, and the automated processing ends the session with message 235.

The above combination of automated processing and assistance from a CSR allows a company to provide assistance to customers but also reduce the expenses of customer support by using automated techniques where available. In the customer support session of FIG. 2, the customer may or may not know which portions of the session are being handled by automated processing and which are being handled by a CSR. The interactions with the automated processing and the CSR may be presented in a single flow as if the conversation was with a single individual.

A CSR may be assisting multiple customers simultaneously. For example, a CSR may respond to a first customer and while waiting to hear back from the first customer, the CSR may respond to a second customer. A user interface (UI) may be presented to a CSR to make it easier for the CSR to respond to customers and to respond to multiple customers simultaneously.

A UI may be presented to a CSR using any appropriate techniques. In some implementations, a CSR may use a website provided by third-party company. For example, a CSR may sign in to the website with a user name and password. In some implementations, a CSR may use a special-purpose application, such as an application running on a desktop computer, laptop, tablet, smart phone, or other device. A CSR may communicate with a customer through the UI using any appropriate techniques, such as typing a message, speaking a message that is transcribed to text using speech recognition, or speaking with the customer through an audio connection (such as VOIP connection). For clarity of presentation, the following description will use text communication as an example, but the same techniques may also be used when communicating by speech.

FIG. 3 is an example user interface that may be used by a CSR in communicating with customers. FIG. 3 includes a customer list portion 310, that may include a list of customers that the CSR is currently communicating with. FIG. 3 also includes conversation portion 320 that allows the CSR to see messages typed by a customer, type messages to the customer, and see the conversation history. FIG. 3 also includes an information portion 330 that provides additional information to assist the CSR, such as a customer profile, billing information, or the status of company services.

During a conversation between a customer and a CSR, each of the customer and the CSR may see the entire history of the conversation with messages from both the customer and the CSR. For example, each message transmitted by the customer may appear on a display of the customer device and in conversation portion 320 of the CSR UI. Each message transmitted by the CSR may also appear on the display of the customer device and in conversation portion 320 of the CSR UI. The customer may also see a history of conversations of previous support requests that were handled by the same or other CSRs or by automated processing. In some implementations, a CSR may also be able to see previous support sessions with the customer or with automated processing.

Information portion 330 may also allow the CSR to transfer the customer to different automated processing tasks. In some implementations, information portion 330 may give the CSR access to a listing or directory of all available automated processing tasks, and the CSR may review the available automated processing tasks or search for relevant automated processing tasks (e.g., using a keyword search). Each of the automated processing tasks may be associated with a control, such as a button, that causes the customer to be transferred to the automated processing task.

In some implementations, information portion 330 may automatically suggest relevant automated processing tasks to the CSR. One or more messages between the customer and the CSR may be processed to determine an intent of the messages, and one or more automated processing tasks may be suggested based on the determined intent. For example, in FIG. 3, the CSR has just informed the customer that a refund has been processed and the current balance on the customer's account. By processing the text of this message, it may be determined that the intent of the message relates to payments and/or billing. Accordingly, automated processing tasks may be suggested to the CSR based on these determined intents. In FIG. 3, information portion 330 shows two suggested automated processing tasks, one for making a payment and another for requesting a copy of a bill. The CSR may select a button corresponding to an automated processing task to transfer the customer to the automated processing task.

When transferring a customer between receiving support from a CSR and receiving support from automated processing it may be desired for the transfer to be quick and seamless to provide a better experience for the customer. FIGS. 4A and 4B illustrate an example architecture for transferring a customer between receiving support from a CSR and receiving support from automated processing.

In FIG. 4A, a customer at customer device 410 is receiving support from a CSR. To receive support, customer device 410 may have a network connection with API server 420. Software running on customer device 410 may send and receive communications from API server 420 using any appropriate network protocols, such as HTTP or TCP. API server 420 may provide any appropriate functionality, such as deciding whether to assist the customer with automated processing or a CSR, selecting a CSR, connecting the customer to a selected CSR, and connecting the customer to automated processing.

Similarly, CSR may provide support using CSR device 460 that may have a network connection with API server 450. Software running on CSR device 460 may send and receive communications from API server 450 using any appropriate network protocols, such as HTTP or TCP. API server 450 may provide any appropriate functionality, such connecting the CSR with customers that have been assigned to the CSR.

When the customer is receiving support from the CSR, the customer may be connected to the CSR using connecting server 440. Although FIG. 4A illustrates one customer and one CSR, in practice, a customer support system may have a large number of customers (each connected to an API server) being simultaneously assisted by a large number of CSRs (each connected to an API server), and connecting server 440 may assist in routing communications received from a customer to the assigned CSR and communications received from a CSR back to the appropriate customer.

In some implementations, connecting server 440 may be implemented using a publish-subscribe pattern (pub-sub). When a customer support session is started with a customer, a pub-sub channel may be created for the customer or for the customer support session. When a CSR is assigned to assist the customer, API server 450 may be subscribed to the pub-sub channel for the customer. Similarly, API server 420 may also be subscribed to the pub-sub channel for the customer. When API server 420 receives a communication from the customer, API server 420 may then publish the communication on the pub-sub channel of the customer by transmitting the communication to connecting server 440. Each subscriber of the channel will then receive the communication. Similarly, when API server 450 receives a communication from the CSR for the customer, API server 450 may then publish the communication on the pub-sub channel of the customer by transmitting the communication to connecting server 440. In some implementations, there may be additional subscribers of the pub-sub channel, such as a server for storing customer support session histories, an admin who is supervising CSRs, multiple CSRs who may be assisting a customer simultaneously, or a customer who may be connected to a support session simultaneously on multiple devices or multiple times on a single device (e.g., multiple tabs of a browser).

In some implementations, additional channels may be created and used, such as a separate channel for each CSR and/or an admin channel for performing administrative functions. For example, API server 420 may subscribe to a channel for CSR device 460. When API server 420 receives a communication from the customer, API server 420 may then publish the communication on more than one channel, such as publishing the communication on a customer channel, a CSR channel, and/or an admin channel. API server 450 may then receive the customer message and present it to the CSR.

Accordingly, FIG. 4A illustrates how communications may be transmitted between a customer and a CSR when a CSR is providing support to a customer. When the customer is instead receiving support from automated processing, such as when the CSR transfers the customer to an automated processing task, the customer may receive support from automated processing component 430 as shown in FIG. 4B.

During automated support, API server 420 may receive a communication from the customer, such as a typed message or any input corresponding to an HTML form. API server 420 may then transmit the customer communication to automated processing component 430, and automated processing component 430 may return to API server 420 a communication to be transmitted to customer device 410, such as one or more user interface elements. The user interface elements may correspond to any information that may be presented to a customer, such as a text message, an image, or a user interface that allows the customer to input further information. Accordingly, numerous communications may be transmitted between customer device 410 and automated processing component 430 in providing automated support to a customer.

After the customer has received support from automated processing component 430, the customer service session may be concluded or the customer may be transferred back to a CSR (either the same CSR as before or a different CSR) for further assistance.

In some implementations, the network connection between customer device 410 and API server 420 may be adapted to provide a better overall experience when transitioning between support from a CSR and support using automated processing. The network connection between customer device 410 and API server 420 may be a persistent network connection that is maintained for an extended period of time or even throughout the entire customer support session. For example, while the customer is receiving support from a CSR, messages between the customer and the CSR may be transmitted on the persistent network connection between customer device 410 and API server 420. After the customer is transferred to automated processing, the same persistent network connection may be used during the automated processing to transmit communications between the customer and the automated processing.

A persistent connection is any connection that uses a single TCP (transmission control protocol) connection to send multiple communications between customer device 410 and API server 420. With a persistent connection, the connection is maintained after a communication is transmitted. By contrast, for connections that are not persistent, the connection may be closed after a transmission of information. Creating a connection between two computers may require several communications back and forth to create the connection, and thus creating a connection may increase communication latency and also consume more resources (e.g., memory or CPU) of the computers establishing the connection. By using a persistent connection between customer device and 410 and API server 420 for both support from a CSR and automated support, latency of communications may be reduced and required computational resources may be reduced.

Any appropriate techniques may be used to create a persistent network connection. For example, a persistent connection may be created using sockets (such as a websocket connection) or long polling.

In some implementations, API server 420 may communicate with connecting server 440 when the customer is receiving automated support. For example, API server 420 may transmit communications from the customer to automated processing component 430 and also publish the communications on one or more pub-sub channels.

In some implementations, an indication of whether the customer is receiving automated support or support from a CSR may be stored to facilitate routing customer communications. For example, a database entry corresponding to the customer or the support session may indicate whether the customer is receiving automated support or support from a CSR, and this entry may be updated when the method of providing support changes. An indication of whether the customer is receiving automated support or support from a CSR may also be transmitted to the customer device.

In some implementations, the components inside box 470 of FIGS. 4A and 4B may be provided by a third-party company, such as the third-party company described above, that is providing customer support services to other companies.

Figure 5:
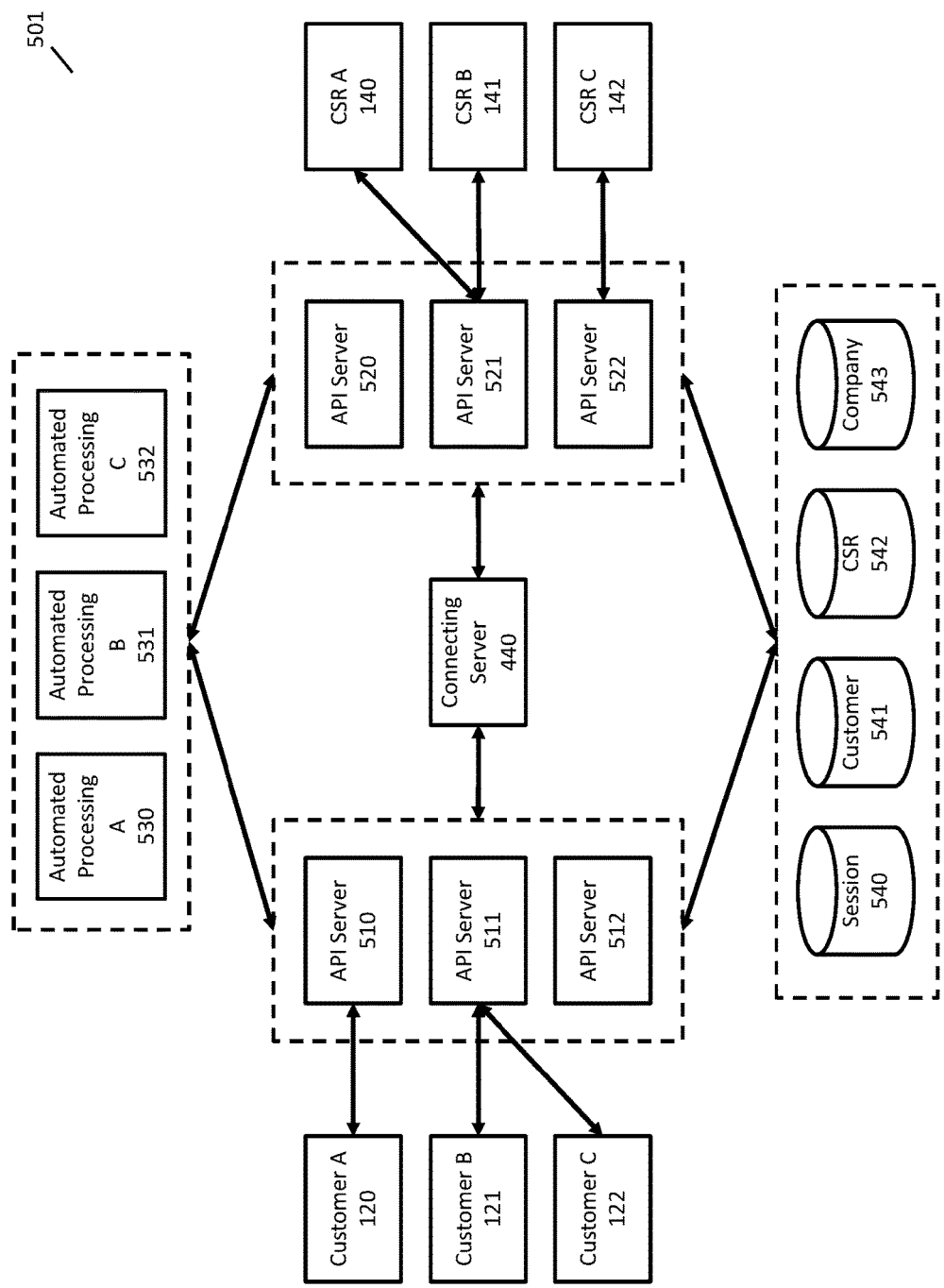
FIG. 5 is an example system that allows customer support to a customer to be transitioned between a customer service representative and automated processing.

FIG. 5 is an example of a system 501 for providing customer support to multiple customers where customers may transition between receiving support from a CSR and support using automated processing. In some implementations, a company may implement a system similar to FIG. 5 for providing customer support to its own customers, and in some implementations, a third-party company may implement portions of FIG. 5 for providing customer support services to multiple companies. For clarity in presentation, an example of a third-party company providing customer support services to three companies (A, B, and C) will be used in describing FIG. 5.

In FIG. 5, three customers, customer A 120, customer B, 121, and customer C 122 are receiving customer support relating products and services of, respectively, company A, company B, and company C. During each customer support session a customer may receive support from a CSR and/or support using automated processing. For example, at some point during the customer support sessions, customer A 120 may receive support from CSR A 140, customer B 121 may receive support from CSR B 141, and customer C 122 may receive support from CSR C 142.

Each customer may additionally receive support via automated processing. In some implementations, third-party company may provide automated processing that is customized to individual companies (e.g., to handle requests specific to a company's products and services). Third-party company may have dedicated server computers to implement automated processing for each company, such as automated processing server A 530, automated processing server B 531, and automated processing server C 532. Alternatively, third-party may have different configurations or different software that runs automated processing on shared servers that are used for multiple companies.

When a customer starts a customer support session, a device of the customer may connect to a server of third-party company, such as the API servers of FIG. 5. Third-party company may have multiple or a fleet of API servers to assist a large number of customers. Multiple customers may be connected to an API server simultaneously as shown in FIG. 5. For example, customer A 120 is connected to API server 510, customer B 121 and customer C 122 are both connected to API server 511, and no customers are connected to API server 512.

When a CSR provides customer support, a device of the CSR will connect to a server of third-party company, such as the API servers of FIG. 5. The same API servers may be used for both customers and CSRs or separate groups of API servers may be provided for each. In the example of FIG. 5, CSR A 140 and CSR B 141 are both connected to API server 521, CSR C 142 is connected to API server 522, and no CSRs are connected to API server 520.

Connecting server 440 may provide the functionality described above to route messages between customers and CSR, such as implementing a channel for each customer. For example, each of API server 510 and API server 521 may subscribe to receive messages relating to customer A from connecting server 440, and each of API server 510 and API server 521 may publish messages to connecting server 440 to be received by the subscribers.

Automated processing may be performed by automated processing server A 530, automated processing server B 531, and automated processing server C 532. The automated processing performed by these servers may include any of the automated processing described herein, such as determining an intent of a message from a customer or a CSR, deciding whether a customer support request should by handled by a CSR or automated processing, providing suggestions to a CSR of automated processing tasks that may be used with a customer, and providing support via automated processing by processing communications received from a customer, generating communications to be transferred to a customer, and performing actions on behalf of the customer (e.g., updating the customer's address in a database).

Any of the server computers of FIG. 5 may access one or more data stores in providing support to a customer. Example data stores include a session data store 540 that may include information about a customer support session, such as communications transmitted to or from the customer, whether the customer is receiving support from a CSR or automated processing, and any actions performed on behalf of the customer during the session; a customer data store 541 that may include information about a customer, such as a profile of the customer or products or services received by the customer; a CSR data store 542 that may include information about CSRs, such as a company for whom the CSR provides support, customers the CSR is currently serving, and the topics for which a CSR provides support (e.g., technical support vs. billing); and a company data store 543 that may include information about companies, such as the status of services provided by the company.

Figure 6:
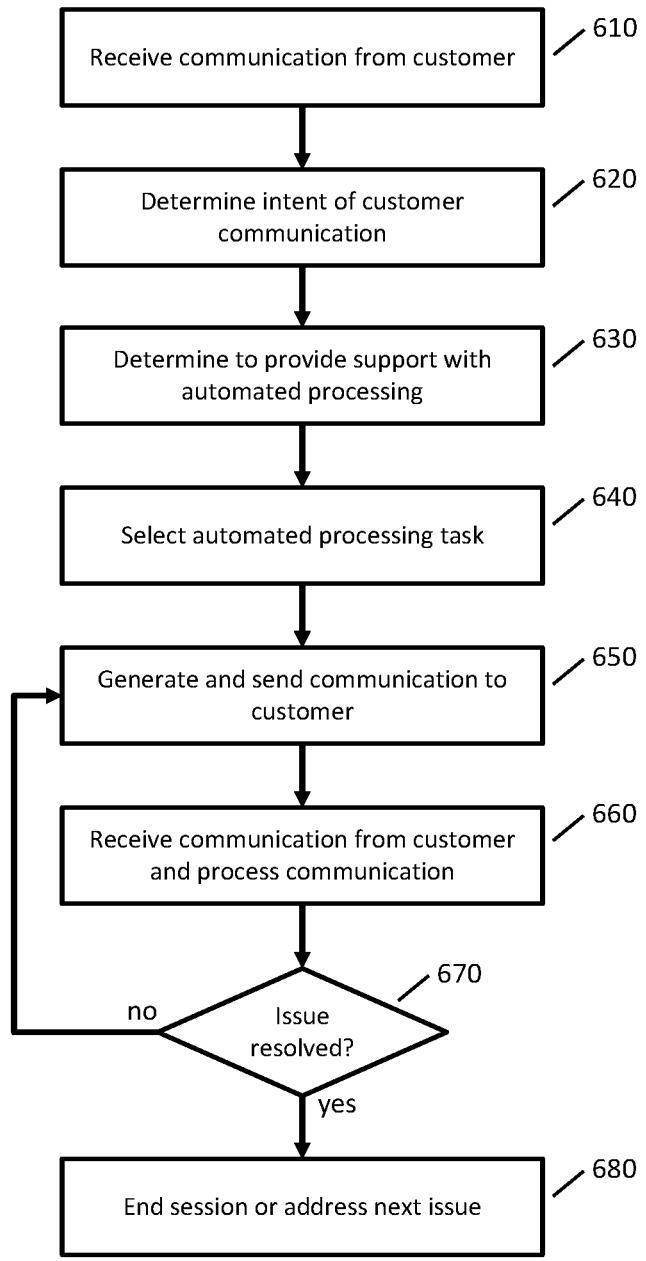
FIG. 6 is a flowchart of an example implementation of providing automated customer support.

FIG. 6 is a flowchart illustrating an example implementation of providing automated customer support. In FIG. 6, the ordering of the steps is exemplary and other orders are possible, not all steps are required and, in some implementations, some steps may be omitted or other steps may be added. Additionally or alternatively, operations described in FIG. 6 may be sub-divided, combined, and/or omitted in whole or part. The process of the flowcharts may be implemented, for example, by any of the computers or systems described herein.

At step 610 a communication is received from a customer seeking customer support. The communication may be text, speech, or a selection of a user interface control (e.g., a button or a form), and the communication may be transmitted from any kind of device using any communication protocol, such as any of the examples described herein.

At step 620 an intent of the communication from the customer is determined using an intent classifier, such as a neural network. Any appropriate techniques may be used to determine the intent of the communication with an intent classifier, such as any of the techniques described in U.S. Pat. No. 9,715,496 or U.S. Pat. No. 10,083,451. In some implementations, an intent classifier may compute a score for each possible intent, and an intent having a highest score may be selected as the intent of the communication. For example, possible intents may relate to changing the customer's address, making a payment, changing a PIN (personal identification number), requesting a copy of a bill, or changing received services. The determination of the intent may use any relevant information, such as information about the customer (e.g., the customer's location or services received by the customer) and the company (e.g., the state of the company's services, such as any current service outages).

In some implementations, an intent classifier may process a word embedding for each word of the message. A word embedding is a vector in an N-dimensional vector space that represents the word but does so in a manner that preserves useful information about the meaning of the word. For example, the word embeddings of words may be constructed so that words with similar meanings or categories are close to one another in the N-dimensional vector space. For example, the word embeddings for "cat" and "cats" may be close to each other because they have similar meanings, and the words "cat" and "dog" may be close to each other because they both relate to pets. Word embeddings may be trained in advance using a training corpus, and word embeddings may later be obtained by performing a lookup to obtain a word embedding for each word of the communication.

Any appropriate techniques may be used to compute word embeddings from a training corpus. For example, the words of the training corpus may be converted to one-hot vectors where the one-hot vectors are the length of the vocabulary and the vectors are 1 in an element corresponding to the word and 0 for other elements. The one-hot vectors may then be processed using any appropriate techniques, such as the techniques implemented in Word2Vec or GloVe software. A word embedding may accordingly be created for each word in the vocabulary.

The word embeddings may be processed by any appropriate neural network, such as a logistic regression classifier, a deep averaging network, a convolution neural network, a recurrent neural network, a recurrent neural network with long short-term memory units, or a recursive neural network. For example, a neural network may output a score for each possible intent indicating a match between the communication and the intent, and an intent having a highest score may be selected as the intent of the communication.

In some implementations, an intent may be selected using a directed graph where nodes of the graph may be associated with one or more intents. For example, the graph may be a tree that hierarchically organizes the possible intents. As the tree is traversed, the nodes may become more specific. For example, a node may relate to technical support, and child nodes of the node may relate to technical support for phone services, technical support for television services, and technical support for Internet services. For another example, a node may relate to billing, and child nodes of the node may relate to obtaining a recent bill, overdue bills, and refunds.

At step 630, it is determined to provide support to the customer using automated processing. Any appropriate techniques may be used to determine whether to provide support to the customer using automated processing, such as any of the techniques described in U.S. Pat. No. 9,715,496 or U.S. Pat. No. 10,083,451. In some implementations, a classifier may process the selected intent and other available information (e.g., information about the customer or the company) to output a classification decision. In some implementations, some intents may allow automatic processing and other intents may not allow automatic processing.

At step 640, an automated processing task is selected from a group of available automated processing tasks. In some implementations, one automated processing task may be available for each intent that allows automatic processing. For example, an automated task for updating a customer's address may be the only automated processing task that corresponds to an intent relating to updating a customer's address. In some implementations, an automated processing task may be selected using a classifier.

In some implementations, aspects of steps 620, 630, and 640 may be combined. For example, steps 620, 630, and 640 may be combined into a single step where a communication of the customer is processed with a classifier and the classifier outputs a score corresponding to each available automated processing task (and perhaps another score for not doing any automated processing). An automated processing task may be selected using the scores, such as selecting an automated processing task having a highest score.

At step 650, the automated processing task is implemented, and servers that implement the automated processing task may generate a communication to send to the customer, such as a message or form fields. Any appropriate technique may be used for implementing the automated processing task, such as any of the techniques described in U.S. Pat. No. 9,715,496 or U.S. Pat. No. 10,083,451. The communication is then sent to the customer.

At step 660, a communication from the customer is received (e.g., a text message) and the communication is processed. The communication from the customer may be processed using any of the techniques described above for steps 620, 630, and 640. For example, one or more classifiers may process the communication to determine one or more of an intent of the communication, a subsequent communication to send to the customer, or an action to perform on behalf of the customer (e.g., changing the customer's address).

At step 670, it is determined whether the customer's support issue has been resolved. If it has not been resolved, then processing may proceed to step 650 where a subsequent communication is sent to the customer. If it has been resolved, then processing may proceed to step 680 where another issue of the customer may be identified or the customer support session may end.

Figure 7:
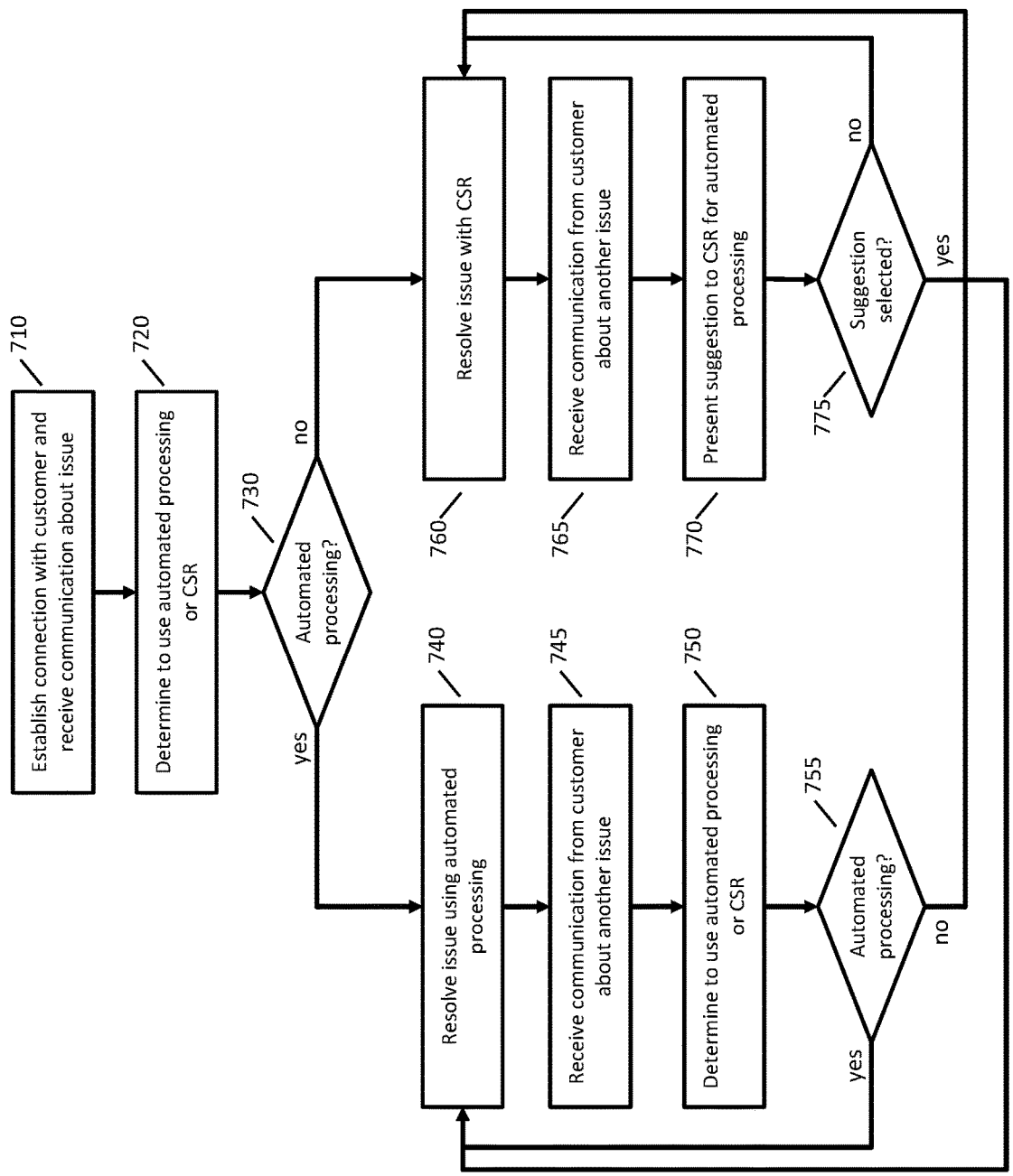
FIG. 7 is a flowchart of an example implementation of transitioning a customer between support provide by a customer service representative and automated processing.

FIG. 7 is a flowchart illustrating an example implementation of assisting a customer with a combination of receiving support from a CSR and receiving automated support. In FIG. 7, the ordering of the steps is exemplary and other orders are possible, not all steps are required and, in some implementations, some steps may be omitted or other steps may be added. Additionally or alternatively, operations described in FIG. 7 may be sub-divided, combined, and/or omitted in whole or part. The process of the flowcharts may be implemented, for example, by any of the computers or systems described herein.

At step 710 a network connection is established with a customer device and a communication is received from a customer seeking customer support. The communication (and other communications of the customer) may be text, an audio signal representing speech of the customer, a selection of a user interface control (e.g., a button or a form), an image, a document, or any other form of communication. The communication may be transmitted from any kind of device using any communication protocol, such as any of the examples described herein.

At step 720, it is determined whether support should be provided to the customer using a CSR or using automated processing. Step 720 may be performed by a CSR or by automated processing as described above. A database entry corresponding to the customer or the session may then be updated to indicate whether the customer is receiving support from a CSR (and which CSR is providing support) or receiving support automatically.

Where it is determined to assist the customer using automated processing, then at step 730 the customer is connected with an automated processing server. At step 740, the automated processing will assist the customer with his customer support request. In assisting the customer, multiple communications or messages may be transmitted between the customer and an automated processing server. For example, the automated processing server may assist the customer with updating his address by receiving the new address and updating a customer profile of the customer with the new address.

After completing the customer support request at step 740, the customer may request customer support for a second issue at step 745. For example, the customer may request to cancel or add some services.

At step 750, it is determined whether customer support for the second issue should be provided by a CSR or by automated processing, such as by using any of the techniques described above. Where it is determined to use automated processing for the customer's second issue, then at step 755, processing may proceed to step 740 where automated processing is used to resolve the customer's second issue. Where is determined to use a CSR to assist the customer, then a database entry for the customer or the session may be updated to indicate that the customer is now receiving support from a CSR, and at step 755, processing may proceed to step 760 to connect the customer with a CSR for resolving the second issue.

Returning to step 720, where it was determined whether to use automated processing or a CSR to resolve the customer's first issue. Where it is determined to use a CSR for resolving the customer's first issue, then at step 730, processing may proceed to step 760 where the CSR assists the customer in resolving the first issue. The customer and CSR may exchange communications or messages to resolve the first issue.

At step 765, a communication may be received from the customer seeking assistance with a second issue. At step 770, the communication from the customer may be automatically processed to determine whether to suggest to the CSR to use automated processing to resolve the second issue, and if so, to suggest one or more specific automated processing tasks that may be available to assist the customer in resolving the second issue.

Any of the processing described in FIG. 6 may be used to decide whether to suggest automated processing to resolve the second issue and to suggest one or more specific automated processing tasks. For example, at step 765, the communication from the customer may be processed to determine an intent of communication, and the intent of the communication may be processed with a classifier to determine whether to suggest an automated processing task and the one or more automate processing tasks to suggest to the CSR.

At step 770, one or more suggestions are presented to the CSR for using automated processing tasks to resolve the customer's second issue. For example, one or more buttons may be presented on a user interface that allow the CSR to transfer the customer to an automated processing task, such as the buttons of FIG. 3.

The CSR may decide to not to transfer the customer to an automated processing task and instead address the customer's second issue himself (or transfer the customer to another CSR). Alternatively, the CSR may decide to transfer the customer to the automated processing task. For example, the CSR may inform the customer that he will be transferred to automated processing for his second issue, and then select a button to cause the customer to be connected with automated processing.

At step 775, where the CSR decides not to transfer the customer to an automated processing task, then processing may proceed to step 760 where the CSR (or another CSR) assists the customer with the second issue. At step 775, where the customer decides to transfer the customer to an automated processing task, then the CSR selects a corresponding button. Selecting the button may cause a communication to be transmitted to a server computer to transfer the customer. For example, a database entry for the customer or the session may be updated to indicate that the customer is now receiving automated support, and then processing proceeds to step 740, where the customer's second issue is resolved with automated processing.

The steps of FIG. 7 may be repeated as needed until all of the customer's issues have been resolved. Once the customer's last issue has been resolved, the support session may be ended by either the automated processing or by the CSR.

In some implementations, during the processing of FIG. 7, a persistent network connection may be maintained by a server (e.g., of a company or third-party company) and a device of the customer. As the customer is transferred between automated processing and a CSR, the internal routing of customer communications may be routed to different locations, but the communications between the customer device and the server may be performed using a single persistent connection that is maintained during the entire customer support session.

In some implementations, transfers between receiving customer support from a CSR and receiving automated support may occur in other ways. For example, after it is determined at step 730 to not use automated support, the customer may be connected with a CSR and the customer communication from step 710 may be presented to the CSR. The CSR may determine from the customer communication (or after additional communications) that automated support is available to assist the customer and transfer the customer to automated support without resolving the customer's issue.

While providing automated support to a customer, the automated processing may determine to transfer the customer to a CSR without resolving the customer's issue. For example, the automated processing may determine that a confidence level of the automated processing decisions are low or may determine that an error or inconsistency has occurred. The customer may then be transferred to a CSR and some or all of the history of the automated support may be presented to the CSR.

Figure 8:
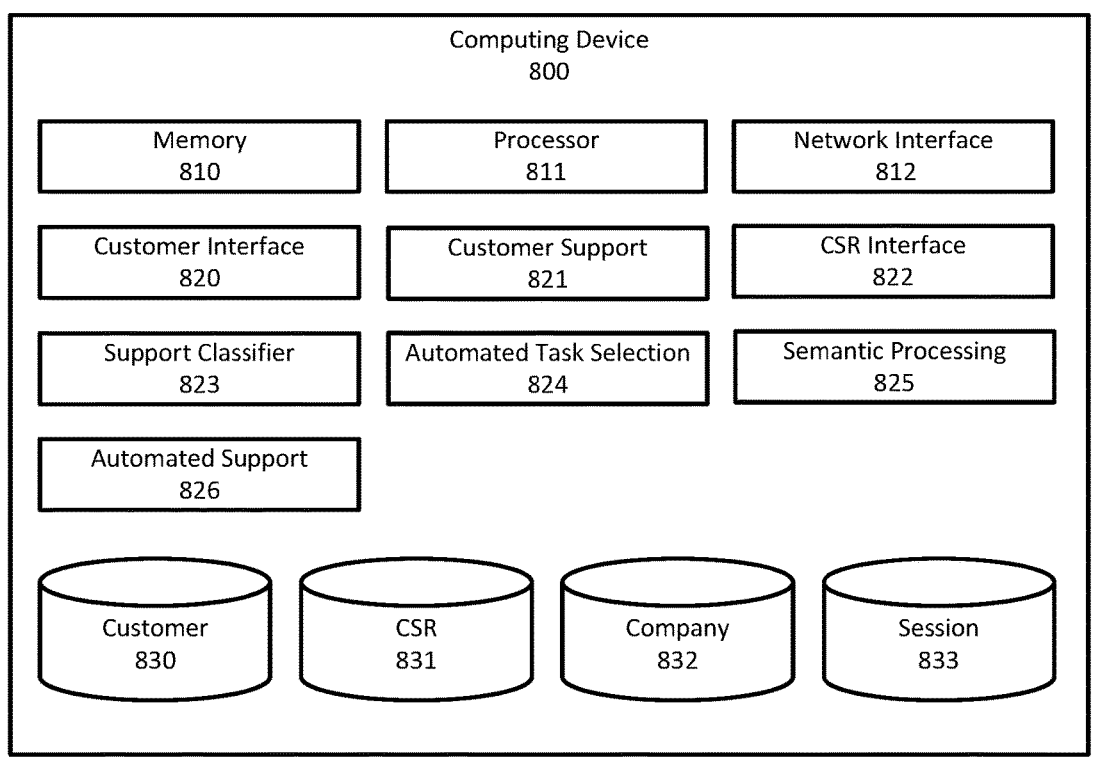
FIG. 8 is an exemplary computing device that may be used to transition a customer between support provide by a customer service representative and automated processing.

FIG. 8 illustrates components of one implementation of a computing device 800 for implementing any of the techniques described above. In FIG. 8, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 800 may include any components typical of a computing device, such as volatile or nonvolatile memory 810, one or more processors 811, and one or more network interfaces 812. Computing device 800 may also include any input and output components, such as displays, keyboards, and touch screens. Computing device 800 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 800 may have a customer interface component 820 that may receive data from a customer device, transmit data to a customer device, and perform other actions, such as any of the actions of the API servers described above. Computing device 800 may have a customer support component 821 that may facilitate customer support sessions with a customer, such as with a CSR or with automated customer support. Computing device 800 may have a CSR interface component 822 that may receive data from a CSR device, transmit data to a CSR device, and perform other actions, such as any of the actions of the API servers described above. In certain embodiments, a CSR interface component 822 transmits a CSR interface to a CSR or CSR device, for example as a CSR interface communication. An example CSR device is responsive to the CSR interface communication, or other instructions from the CSR interface component 822, to provide a configured user interface and/or user interface element to the CSR. Computing device 800 may have a support classifier component 823 that may decide whether to provide customer support with a CSR or with automated support. Computing device 800 may have an automated task selection component 824 that may select an automated task when providing automated support or for suggesting automated support tasks to a CSR. Computing device 800 may have a semantic processing component 825 that may perform any relevant natural language processing or understanding tasks, such as determining an intent of a customer message. Computing device 800 may have an automated support component 826 that provides automated support by processing communications received from a customer, generating communications to transmit to a customer, and performing actions on behalf of a customer.

Computing device 800 may include or have access to various data stores, such as data stores 830, 831, 832, and 833. Data stores may use any known storage technology such as files or relational or non-relational databases. For example, computing device 800 may have customer data store 830 to store any relevant information about customers. Computing device 800 may have a CSR data store 831 that may store any relevant information about CSRs. Computing device 800 may have company data store 832 that may store any relevant information about companies to which third-party company is providing services. Computing device 800 may have a session data store 833 that may store any relevant information about customer support sessions with a customer.

It can be seen that certain systems, methods, and devices described throughout the present disclosure provide for improved classification and/or routing of customer interactions, including customer assistance requests, technical assistance requests, service or service change requests, and/or purchase requests, relative to previously known systems. In certain embodiments, systems, methods, and devices described throughout the present disclosure reduce and/or eliminate the need for customers to navigate web pages and/or menus to access appropriate information to address a request. In certain embodiments, systems, methods, and devices described throughout the present disclosure improve the customer experience by providing an automated response that is configured to address the customer request, by notifying a customer service representative that an automated response is available for the customer request, and/or by providing an improved intent determination of the customer request that allows the customer service representative to more efficiently and reliably address the customer request. In certain embodiments, systems, methods, and devices described throughout the present disclosure improve the customer experience by ensuring that a customer support representative provides support that is properly responsive to the customer request. In certain embodiments, systems, methods, and devices described throughout the present disclosure improve the customer experience by ensuring that a response to the customer request is properly addressed, for example through automated processing that utilizes text from the customer request, thereby eliminating manual entry errors and/or customer to customer service representative mis-communications.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for using an intent classifier for automating communications, the method comprising:
    establishing a communications session with a first user, wherein the communications session includes a first network connection between a first device of the first user and a first server;
    receiving, at the first server via the first network connection, first text from the first user requesting assistance;
    transmitting, by the first server, the first text to a user interface of a second device of a second user, wherein the second user is assisting the first user and wherein the first text is transmitted via a second network connection between a second server and the second device of the second user;
    processing the first text with the intent classifier to compute a score for each intent of a plurality of possible intents;
    selecting at least two intents from the plurality of possible intents using the scores, wherein the at least two intents relate to the assistance requested by the first user;
    determining, using the at least two intents, that a plurality of automated processing tasks is available to assist the first user with the assistance requested by the first user;
    transmitting a listing of the plurality of automated processing tasks to the second user via the user interface;
    receiving a communication from the second user via the user interface to transfer the first user the automated processing by selecting an automated processing task from the plurality of automated processing tasks;
    assisting the first user with the automated processing, wherein the automated processing comprises:
    receiving, at the first server via the first network connection, a communication from the first device of the first user,
    determining a response to the communication from the first device using on automated processing server, and
    transmitting, by the first server via the first network connection, the response to the first device of the first user.

2. The computer-implemented method of claim 1, wherein:
    transmitting the listing of the plurality of automated processing tasks to the second user via the user interface comprises causing a user interface element to be presented to the second user; and
    the communication from the second user via the user interface to transfer the first user to the automated processing corresponds to a selection of the user interface element.

3. The computer-implemented method of claim 1, wherein the assistance requested by the first user corresponds to updating an address of the first user, processing a payment, changing a PIN of the first user, or changing services received by the first user.

4. The computer-implemented method of claim 1, wherein the first network connection is a persistent connection, and wherein the persistent connection is used for receiving the first text and assisting the first user using the automated processing.

5. The computer-implemented method of claim 4, wherein the persistent connection comprises a websocket or long polling.

6. The computer-implemented method of claim 1, wherein:
    transmitting the first text to the second user comprises transmitting the first text via a connecting server;
    the connecting server allows other servers to publish to channels and to subscribe to the channels;
    the first server publishes the first text to a channel of the connecting server; and
    the first server subscribes to the channel of the connecting server.

7. The computer-implemented method of claim 1, wherein processing the first text with the intent classifier comprises obtaining word embeddings for words of the first text.

8. The computer-implemented method of claim 1, wherein selecting the at least two intents comprises using information about services received by the first user, a location of the first user, or a status of services provided by a company.

9. A system for providing customer support, the system comprising: at least one server comprising at least one processor and at least one memory, the at least one server configured to:
  establish a communications session with a first user, wherein the communications session includes a first network connection between a first device of the first user and a first server;
  receive at the first server via the first network connection, first text from the first user requesting assistance;
  transmit, by the first server, the first text to a user interface of a second device of a second user, wherein the second user is assisting the first user and wherein the first text is transmitted via a second network connection between a second server and the second device of the second user;
  process the first text with an intent classifier to compute a score for each intent of a plurality of possible intents;
  select at least two intents from the plurality of possible intents using the scores, wherein the at least two intents relate to the assistance requested by the first user;
  determine, using the at least two intents, that a plurality of automated processing tasks is available to assist the first user with the assistance requested by the first user;
  transmit a listing of the plurality of automated processing tasks to the second user via the user interface;
  receive a communication from the second user via the user interface to transfer the first user to the automated processing by selecting an automated processing task from the plurality of automated processing tasks;
  assist the first user with the automated processing using the first network connection.

10. The system of claim 9, wherein the at least one server is further configured to:
  receive, at the first server, second text from the first user requesting second assistance;
  transmit the second text to the user interface;
  process the second text with the intent classifier to compute a second score for each intent of the plurality of possible intents;
  select at least one second intent from the plurality of possible intents using the scores, wherein the second intent relates to the second assistance requested by the first user; and
  determine, using the at least one second intent, that automated processing is not available to assist the first user with the second assistance requested by the first user.

11. The system of claim 9, wherein the first network connection is a persistent connection, and wherein the persistent connection is used for receiving the first text and assisting the first user using the automated processing.

12. The system of claim 9, wherein the automated processing comprises transmitting an API request to a server of a company providing a service to the first user.

13. The system of claim 9, wherein the at least one server is further configured to:
  update a database entry to indicate that the first user is receiving support from the second user; and
  update the database entry to indicate that the first user is receiving support using the automated processing after receiving the communication from the second user to assist the first user using the automated processing.

14. The system of claim 9, wherein the at least one server is configured to:
  transmit the first text to the second user by transmitting the first text via a connecting server;
  the connecting server allows other servers to publish to channels and to subscribe to the channels;
  the first server publishes the first text to a channel of the connecting server; and
  the first server subscribes to the channel of the connecting server.

15. The system of claim 9, wherein the at least one server is operated by a third-party company that provides services to a company and the first user is a customer of the company.

16. One or more non-transitory, computer-readable media comprising computer executable instructions that, when executed, cause at least one processor to perform actions comprising:
  establishing a communications session with a first user, wherein the communications session includes a first network connection between a first device of the first user and a first server;
  receiving, at the first server via the first network connection, first text from the first user requesting assistance;
  transmitting, by the first server, the first text to a user interface of a second device of a second user, wherein the second user is assisting the first user and wherein the first text is transmitted via a second network connection between a second server and the second device of the second user;
  processing the first text with an intent classifier to compute a score for each intent of a plurality of possible intents;
  selecting at least two intents from the plurality of possible intents using the scores, wherein the at least two intents relate to the assistance requested by the first user;
  determining, using the at least two intents, that a plurality of automated processing tasks is available to assist the first user with the assistance requested by the first user;
  transmitting a listing of the plurality of automated processing tasks to the second user via the user interface;
  receiving a communication from the second user via the user interface to transfer the first user to the automated processing by selecting an automated processing task from the plurality of automated processing tasks; and
  assisting the first user with the automated processing using the first network connection.

17. The one or more non-transitory, computer-readable media of claim 16, wherein selecting the at least two intents comprises using information about services received by the first user, a location of the first user, or a status of services provided by a company.

18. The one or more non-transitory, computer-readable media of claim 16, wherein the first network connection from the first server to the first device is a persistent connection, and wherein the persistent connection is used for receiving the first text and assisting the first user using the automated processing.

19. The one or more non-transitory, computer-readable media of claim 16, wherein the intent classifier comprises a neural network.

20. The one or more non-transitory, computer-readable media of claim 16, wherein assisting the first user using the automated processing comprises transmitting a text message to the first user or presenting a form field to the first user.

* * * * *